(12) United States Patent
Li et al.

(10) Patent No.: US 12,388,498 B2
(45) Date of Patent: Aug. 12, 2025

(54) METHOD, APPARATUS, AND COMPUTER READABLE MEDIA FOR ACKNOWLEDGEMENT IN WIRELESS NETWORKS

(71) Applicant: AX Wireless, LLC, Austin, TX (US)

(72) Inventors: Guoqing C. Li, Portland, OR (US); Robert J. Stacey, Portland, OR (US)

(73) Assignee: AX Wireless, LLC, Austin, TX (US)

( * ) Notice: Subject to any disclaimer, the term of this patent is extended or adjusted under 35 U.S.C. 154(b) by 0 days.

(21) Appl. No.: 17/730,545

(22) Filed: Apr. 27, 2022

(65) Prior Publication Data

US 2022/0255594 A1 Aug. 11, 2022

Related U.S. Application Data

(63) Continuation of application No. 16/256,842, filed on Jan. 24, 2019, now abandoned, which is a
(Continued)

(51) Int. Cl.
*H04B 7/0452* (2017.01)
*H04L 1/1607* (2023.01)
(Continued)

(52) U.S. Cl.
CPC ......... *H04B 7/0452* (2013.01); *H04L 1/1614* (2013.01); *H04L 1/18* (2013.01);
(Continued)

(58) Field of Classification Search
None
See application file for complete search history.

(56) References Cited

U.S. PATENT DOCUMENTS 7,466,964 B2   12/2008   Sondur
7,809,020 B2   10/2010   Douglas et al.
(Continued)

FOREIGN PATENT DOCUMENTS

CN   101166080 A   4/2008
CN   101207597 A   6/2008
(Continued)

OTHER PUBLICATIONS

Chinese Application Serial No. 201910217247.1, Office Action mailed May 6, 2021, With English translation, 12 pages.
(Continued)

*Primary Examiner* — Mariela Vidal Carpio
(74) *Attorney, Agent, or Firm* — Sughrue Mion, PLLC

(57) ABSTRACT

Embodiments of a system and method for communicating acknowledgments in a wireless network are generally described herein. In some embodiments, a method of wirelessly communicating acknowledgements includes receiving a first signal on a first subchannel from a second wireless device. The method may include transmitting a block acknowledgement of the first signal on a subchannel. The first wireless communication device may not receive a block acknowledgement request to transmit the block acknowledgement. In some embodiments, a method of communicating block acknowledgements includes transmitting a first transmission to a first wireless device on a first subchannel and a second transmission to a second wireless device on a second subchannel The method may include receiving a first block acknowledgement from the first wireless device and a second block acknowledgement from second wireless device. The first and second block acknowledgement may be received on one of the first and second subchannels.

12 Claims, 10 Drawing Sheets

Related U.S. Application Data continuation of application No. 14/498,385, filed on Sep. 26, 2014, now abandoned.

(60) Provisional application No. 61/990,414, filed on May 8, 2014.

(51) Int. Cl.
| | |
|---|---|
| *H04L 1/18* | (2023.01) |
| *H04L 1/1829* | (2023.01) |
| *H04L 1/1867* | (2023.01) |
| *H04L 5/00* | (2006.01) |
| *H04W 28/12* | (2009.01) |
| *H04W 72/1268* | (2023.01) |
| *H04W 72/1273* | (2023.01) |

(52) U.S. Cl.
CPC .......... *H04L 1/1854* (2013.01); *H04L 1/1861* (2013.01); *H04L 1/1896* (2013.01); *H04L 5/0055* (2013.01); *H04W 28/12* (2013.01); *H04W 72/1268* (2013.01); *H04L 1/1664* (2013.01); *H04L 1/1685* (2013.01); *H04L 5/0007* (2013.01); *H04W 72/1273* (2013.01)

(56) References Cited

U.S. PATENT DOCUMENTS

| | | | |
|---|---|---|---|
| 8,320,252 B2* | 11/2012 | Derom | H04L 1/1832 |
| | | | 370/235 |
| 8,395,997 B2 | 3/2013 | Banerjea et al. | |
| 8,509,323 B2 | 8/2013 | Nangia et al. | |
| 8,560,009 B2 | 10/2013 | Etemad | |
| 8,948,064 B2 | 2/2015 | Shahar | |
| 8,976,741 B2* | 3/2015 | Wentink | H04W 72/23 |
| | | | 370/329 |
| 8,989,158 B2 | 3/2015 | Seok | |
| 9,160,503 B2 | 10/2015 | Kim et al. | |
| 9,271,241 B2 | 2/2016 | Kenney et al. | |
| 9,325,463 B2 | 4/2016 | Azizi et al. | |
| 9,450,725 B2 | 9/2016 | Azizi et al. | |
| 9,462,504 B2 | 10/2016 | Stephens et al. | |
| 9,544,914 B2 | 1/2017 | Azizi et al. | |
| 9,615,291 B2 | 4/2017 | Kenney et al. | |
| 9,648,620 B2 | 5/2017 | Tandra | |
| 9,668,243 B1* | 5/2017 | Gong | H04W 74/0825 |
| 9,680,603 B2 | 6/2017 | Azizi et al. | |
| 9,705,643 B2 | 7/2017 | Li et al. | |
| 9,838,961 B2 | 12/2017 | Kenney et al. | |
| 9,853,784 B2 | 12/2017 | Azizi et al. | |
| 9,867,210 B2 | 1/2018 | Azizi | |
| 9,882,695 B2 | 1/2018 | Azizi et al. | |
| 10,819,471 B2* | 10/2020 | Merlin | H04W 4/06 |
| 2004/0054820 A1 | 3/2004 | Karaoguz et al. | |
| 2004/0146117 A1 | 7/2004 | Subramaniam et al. | |
| 2005/0015703 A1 | 1/2005 | Terry et al. | |
| 2005/0063336 A1 | 3/2005 | Kim et al. | |
| 2005/0135410 A1 | 6/2005 | Stephens | |
| 2005/0276347 A1 | 12/2005 | Mujtaba et al. | |
| 2006/0018249 A1 | 1/2006 | Shearer et al. | |
| 2006/0030322 A1 | 2/2006 | Kim et al. | |
| 2006/0062314 A1 | 3/2006 | Palin et al. | |
| 2006/0067415 A1 | 3/2006 | Mujtaba | |
| 2006/0105764 A1 | 5/2006 | Krishnaswamy et al. | |
| 2006/0107166 A1* | 5/2006 | Nanda | H04L 1/1887 |
| | | | 714/748 |
| 2006/0153060 A1 | 7/2006 | Cho | |
| 2007/0014375 A1 | 1/2007 | Nakao | |
| 2007/0042715 A1 | 2/2007 | Salo et al. | |
| 2007/0060161 A1 | 3/2007 | Chindapol et al. | |
| 2007/0147226 A1 | 6/2007 | Khandekar et al. | |
| 2007/0147521 A1 | 6/2007 | Horng et al. | |
| 2007/0153929 A1 | 7/2007 | Ballentin et al. | |
| 2007/0202816 A1 | 8/2007 | Zheng | |
| 2007/0207742 A1 | 9/2007 | Kim et al. | |
| 2007/0242600 A1 | 10/2007 | Li et al. | |
| 2008/0013496 A1 | 1/2008 | Dalmases et al. | |
| 2008/0049851 A1 | 2/2008 | Nangia et al. | |
| 2008/0188232 A1 | 8/2008 | Park et al. | |
| 2008/0212612 A1* | 9/2008 | Singh | H04L 1/1685 |
| | | | 370/310 |
| 2008/0232339 A1 | 9/2008 | Yang et al. | |
| 2008/0240018 A1 | 10/2008 | Xue et al. | |
| 2008/0240275 A1 | 10/2008 | Cai | |
| 2008/0304430 A1* | 12/2008 | Zhuyan | H04L 1/1887 |
| | | | 370/278 |
| 2009/0007185 A1 | 1/2009 | Nix et al. | |
| 2009/0122882 A1 | 5/2009 | Mujtaba | |
| 2009/0270109 A1 | 10/2009 | Wang Helmersson et al. | |
| 2009/0279470 A1* | 11/2009 | Seok | H04L 12/189 |
| | | | 370/312 |
| 2009/0310692 A1 | 12/2009 | Kafle et al. | |
| 2010/0046671 A1 | 2/2010 | Ali et al. | |
| 2010/0067480 A1 | 3/2010 | Wang et al. | |
| 2010/0080312 A1 | 4/2010 | Moffatt et al. | |
| 2010/0091673 A1 | 4/2010 | Sawai et al. | |
| 2010/0098181 A1 | 4/2010 | Jacobsen et al. | |
| 2010/0107042 A1 | 4/2010 | Sawai et al. | |
| 2010/0110804 A1 | 5/2010 | Yeh | |
| 2010/0157956 A1 | 6/2010 | Takahashi | |
| 2010/0157970 A1 | 6/2010 | Gotman et al. | |
| 2010/0172316 A1 | 7/2010 | Hwang et al. | |
| 2010/0220678 A1 | 9/2010 | Wentink | |
| 2010/0220679 A1 | 9/2010 | Abraham et al. | |
| 2010/0246375 A1 | 9/2010 | Orlik et al. | |
| 2010/0246539 A1 | 9/2010 | Guillouard et al. | |
| 2010/0260114 A1* | 10/2010 | Vermani | H04L 5/0055 |
| | | | 370/329 |
| 2010/0260159 A1 | 10/2010 | Zhang et al. | |
| 2010/0309834 A1 | 12/2010 | Fischer et al. | |
| 2010/0322166 A1 | 12/2010 | Sampath et al. | |
| 2011/0002219 A1 | 1/2011 | Kim et al. | |
| 2011/0013608 A1 | 1/2011 | Lee et al. | |
| 2011/0026623 A1 | 2/2011 | Srinivasa et al. | |
| 2011/0032850 A1 | 2/2011 | Cai | |
| 2011/0032875 A1 | 2/2011 | Erceg et al. | |
| 2011/0038441 A1 | 2/2011 | Shi | |
| 2011/0063991 A1 | 3/2011 | Sampath et al. | |
| 2011/0075625 A1 | 3/2011 | Nystrom et al. | |
| 2011/0085513 A1 | 4/2011 | Chen et al. | |
| 2011/0096685 A1 | 4/2011 | Lee et al. | |
| 2011/0096710 A1* | 4/2011 | Liu | H04L 1/1614 |
| | | | 370/312 |
| 2011/0110454 A1* | 5/2011 | Sampath | H04L 1/02 |
| | | | 375/267 |
| 2011/0116401 A1 | 5/2011 | Banerjea et al. | |
| 2011/0149882 A1 | 6/2011 | Gong et al. | |
| 2011/0158159 A1 | 6/2011 | Gong et al. | |
| 2011/0188598 A1 | 8/2011 | Lee et al. | |
| 2011/0194544 A1 | 8/2011 | Yang et al. | |
| 2011/0206156 A1 | 8/2011 | Lee et al. | |
| 2011/0222486 A1 | 9/2011 | Hart | |
| 2011/0235593 A1 | 9/2011 | Gong et al. | |
| 2011/0243025 A1 | 10/2011 | Kim et al. | |
| 2011/0243073 A1* | 10/2011 | Gong | H04L 5/0055 |
| | | | 370/329 |
| 2011/0249660 A1 | 10/2011 | Noh et al. | |
| 2011/0261708 A1 | 10/2011 | Grandhi | |
| 2011/0261742 A1* | 10/2011 | Wentink | H04L 1/1854 |
| | | | 370/312 |
| 2011/0261769 A1 | 10/2011 | Ji et al. | |
| 2011/0268094 A1 | 11/2011 | Gong et al. | |
| 2011/0299474 A1 | 12/2011 | Li et al. | |
| 2011/0305176 A1* | 12/2011 | Wentink | H04W 28/12 |
| | | | 370/310 |
| 2011/0305296 A1 | 12/2011 | Van Nee | |
| 2012/0002756 A1 | 1/2012 | Zhang et al. | |
| 2012/0063433 A1* | 3/2012 | Wentink | H04W 74/0816 |
| | | | 370/338 |
| 2012/0106481 A1 | 5/2012 | Cho et al. | |
| 2012/0127940 A1 | 5/2012 | Lee et al. | |
| 2012/0155424 A1 | 6/2012 | Kim et al. | |
| 2012/0155444 A1 | 6/2012 | Chiueh et al. | |

(56) References Cited

U.S. PATENT DOCUMENTS

| | | |
|---|---|---|
| 2012/0170563 A1 | 7/2012 | Abraham et al. |
| 2012/0201213 A1 | 8/2012 | Banerjea et al. |
| 2012/0218983 A1* | 8/2012 | Noh ............... H04W 72/20 370/338 |
| 2012/0243485 A1 | 9/2012 | Merlin et al. |
| 2012/0269124 A1 | 10/2012 | Porat |
| 2012/0275446 A1 | 11/2012 | Stacey et al. |
| 2012/0314697 A1 | 12/2012 | Noh et al. |
| 2012/0314786 A1 | 12/2012 | Atungsiri et al. |
| 2012/0320890 A1 | 12/2012 | Zhang et al. |
| 2012/0324315 A1 | 12/2012 | Zhang et al. |
| 2012/0327870 A1 | 12/2012 | Grandhi et al. |
| 2012/0327915 A1 | 12/2012 | Kang et al. |
| 2013/0044743 A1* | 2/2013 | Zhang ............... H04L 69/22 370/338 |
| 2013/0070642 A1 | 3/2013 | Kim et al. |
| 2013/0088983 A1 | 4/2013 | Pragada et al. |
| 2013/0136075 A1 | 5/2013 | Yu et al. |
| 2013/0142155 A1 | 6/2013 | Trainin et al. |
| 2013/0172035 A1* | 7/2013 | Wentink ............ H04L 5/0055 455/517 |
| 2013/0177090 A1 | 7/2013 | Yang et al. |
| 2013/0188567 A1 | 7/2013 | Wang et al. |
| 2013/0188572 A1 | 7/2013 | Cheong et al. |
| 2013/0215993 A1 | 8/2013 | Taghavi Nasrabadi et al. |
| 2013/0229996 A1 | 9/2013 | Wang et al. |
| 2013/0230035 A1 | 9/2013 | Grandhi et al. |
| 2013/0235720 A1 | 9/2013 | Wang et al. |
| 2013/0235773 A1* | 9/2013 | Wang ............... H04W 52/0203 370/311 |
| 2013/0235943 A1* | 9/2013 | Tong ............... H04L 5/0007 375/259 |
| 2013/0250940 A1 | 9/2013 | Parlamas |
| 2013/0258975 A1 | 10/2013 | Krishnamurtby et al. |
| 2013/0265907 A1 | 10/2013 | Kim et al. |
| 2013/0286925 A1* | 10/2013 | Fischer ............. H04L 1/0071 370/312 |
| 2013/0286959 A1* | 10/2013 | Lou ............... H04L 5/003 370/329 |
| 2013/0301551 A1 | 11/2013 | Ghosh et al. |
| 2013/0301563 A1 | 11/2013 | Gupta et al. |
| 2013/0301569 A1* | 11/2013 | Wang ............... H04L 1/1864 370/329 |
| 2014/0010196 A1 | 1/2014 | Shapira |
| 2014/0016607 A1 | 1/2014 | Hart |
| 2014/0045514 A1* | 2/2014 | Lee ............... H04W 16/14 455/454 |
| 2014/0098724 A1* | 4/2014 | Park ............... H04W 72/23 370/330 |
| 2014/0112274 A1 | 4/2014 | Moon et al. |
| 2014/0169245 A1 | 6/2014 | Kenney et al. |
| 2014/0169356 A1 | 6/2014 | Noh et al. |
| 2014/0205029 A1 | 7/2014 | Srinivasa et al. |
| 2014/0211775 A1 | 7/2014 | Sampath et al. |
| 2014/0269544 A1 | 9/2014 | Zhu et al. |
| 2014/0307650 A1 | 10/2014 | Vermani et al. |
| 2014/0328265 A1* | 11/2014 | Sampath ............ H04W 72/541 370/329 |
| 2014/0328333 A1* | 11/2014 | Seo ............... H04L 1/1854 370/336 |
| 2014/0369276 A1 | 12/2014 | Porat et al. |
| 2015/0023335 A1 | 1/2015 | Vermani et al. |
| 2015/0043414 A1 | 2/2015 | Han et al. |
| 2015/0063255 A1 | 3/2015 | Tandra et al. |
| 2015/0063318 A1 | 3/2015 | Merlin et al. |
| 2015/0071051 A1* | 3/2015 | Zhu ............... H04W 72/121 370/216 |
| 2015/0085836 A1 | 3/2015 | Kang et al. |
| 2015/0117428 A1 | 4/2015 | Lee et al. |
| 2015/0124689 A1* | 5/2015 | Merlin ............. H04W 4/06 370/312 |
| 2015/0124690 A1* | 5/2015 | Merlin ............. H04L 5/0055 370/312 |
| 2015/0124745 A1 | 5/2015 | Tandra et al. |
| 2015/0131517 A1* | 5/2015 | Chu ............... H04L 5/0037 370/312 |
| 2015/0131756 A1 | 5/2015 | Suh et al. |
| 2015/0139090 A1 | 5/2015 | Stephens et al. |
| 2015/0139091 A1 | 5/2015 | Azizi et al. |
| 2015/0139118 A1 | 5/2015 | Azizi et al. |
| 2015/0139119 A1 | 5/2015 | Azizi et al. |
| 2015/0139205 A1 | 5/2015 | Kenney et al. |
| 2015/0139206 A1 | 5/2015 | Azizi et al. |
| 2015/0146648 A1* | 5/2015 | Viger ............. H04L 1/1685 370/329 |
| 2015/0146808 A1 | 5/2015 | Chu et al. |
| 2015/0207599 A1 | 7/2015 | Kim et al. |
| 2015/0208394 A1 | 7/2015 | Seo et al. |
| 2015/0237531 A1 | 8/2015 | Hao et al. |
| 2015/0250003 A1* | 9/2015 | Seok ............. H04L 1/0008 370/329 |
| 2015/0271002 A1* | 9/2015 | Oh ............... H04L 27/2626 370/329 |
| 2015/0288489 A1 | 10/2015 | Azizi et al. |
| 2015/0304011 A1* | 10/2015 | Ponnuswamy ....... H04B 7/0617 370/329 |
| 2015/0326351 A1 | 11/2015 | Kim et al. |
| 2015/0326408 A1 | 11/2015 | Vermani et al. |
| 2015/0327121 A1 | 11/2015 | Li et al. |
| 2015/0351102 A1* | 12/2015 | Trainin ............. H04W 72/20 370/329 |
| 2015/0365972 A1* | 12/2015 | Seok ............. H04W 74/0891 370/336 |
| 2016/0020885 A1 | 1/2016 | Li et al. |
| 2016/0080115 A1* | 3/2016 | Josiam ............. H04L 5/0055 370/329 |
| 2016/0081010 A1 | 3/2016 | Seok |
| 2016/0087775 A1* | 3/2016 | Hedayat ............ H04L 5/0055 370/329 |
| 2016/0112899 A1 | 4/2016 | Kenney et al. |
| 2016/0197704 A1* | 7/2016 | Liu ............... H04L 1/1621 370/329 |
| 2016/0211944 A1 | 7/2016 | Kenney et al. |
| 2016/0211961 A1 | 7/2016 | Azizi et al. |
| 2016/0212748 A1* | 7/2016 | Yang ............... H04L 1/1874 |
| 2016/0227572 A1 | 8/2016 | Li et al. |
| 2016/0241366 A1 | 8/2016 | Azizi et al. |
| 2016/0242173 A1 | 8/2016 | Li et al. |
| 2016/0330742 A1* | 11/2016 | Li ............... H04L 5/0037 |
| 2016/0337100 A1* | 11/2016 | Yang ............. H04L 5/0037 |
| 2016/0344531 A1 | 11/2016 | Li et al. |
| 2017/0005709 A1* | 1/2017 | Li ............... H04L 1/00 |
| 2017/0019916 A1 | 1/2017 | Azizi et al. |
| 2017/0078107 A1* | 3/2017 | Itagaki ............ H04L 1/1854 |
| 2017/0111154 A1 | 4/2017 | Azizi et al. |
| 2017/0135035 A1 | 5/2017 | Azizi et al. |
| 2017/0149547 A1* | 5/2017 | Kim ............. H04L 1/1685 |
| 2017/0201359 A1 | 7/2017 | Li et al. |
| 2017/0359152 A1* | 12/2017 | Li ............... H04L 5/0094 |
| 2018/0076260 A1* | 3/2018 | Chu ............... H04L 1/1854 |
| 2018/0184374 A1* | 6/2018 | Yang ............. H04W 52/0216 |
| 2018/0241531 A1* | 8/2018 | Wang ............. H04L 1/1854 |
| 2019/0238353 A1* | 8/2019 | Choi ............. H04B 7/0452 |
| 2024/0080076 A1* | 3/2024 | Gong ............. H04B 7/0617 |

FOREIGN PATENT DOCUMENTS

| | | |
|---|---|---|
| CN | 101208895 A | 6/2008 |
| CN | 101433018 A | 5/2009 |
| CN | 102090024 A | 6/2011 |
| CN | 102428672 A | 4/2012 |
| CN | 102577493 A | 7/2012 |
| CN | 103703711 A | 4/2014 |
| CN | 105379217 A | 3/2016 |
| CN | 105637968 A | 6/2016 |
| CN | 105659656 A | 6/2016 |
| CN | 105659681 A | 6/2016 |
| CN | 105706407 A | 6/2016 |
| CN | 105900511 A | 8/2016 |
| CN | 105917611 A | 8/2016 |
| CN | 105917730 A | 8/2016 |
| CN | 106100807 A | 11/2016 |

(56) References Cited

FOREIGN PATENT DOCUMENTS

| | | |
|---|---|---|
| CN | 106464638 A | 2/2017 |
| CN | 106464652 A | 2/2017 |
| CN | 106465360 A | 2/2017 |
| CN | 106899385 A | 6/2017 |
| CN | 106105080 B | 8/2019 |
| CN | 110098907 | 8/2019 |
| CN | 106464634 B | 3/2020 |
| EP | 2362580 A2 | 8/2011 |
| EP | 2499872 A1 | 9/2012 |
| EP | 3072255 A1 | 9/2016 |
| EP | 3072270 A1 | 9/2016 |
| EP | 3072324 A1 | 9/2016 |
| EP | 3072344 A1 | 9/2016 |
| EP | 3072345 A1 | 9/2016 |
| EP | 3072347 A1 | 9/2016 |
| EP | 3072254 B1 | 12/2019 |
| EP | 3182635 B1 | 4/2020 |
| JP | 2007074689 A | 3/2007 |
| KR | 1020110044938 A | 5/2011 |
| KR | 1020120127676 A | 11/2012 |
| TW | 200539601 A | 12/2005 |
| TW | 201044815 A | 12/2010 |
| TW | 201141288 A | 11/2011 |
| TW | 201234880 A | 8/2012 |
| TW | 201251382 A | 12/2012 |
| TW | 201301827 A | 1/2013 |
| TW | 201306533 A | 2/2013 |
| TW | 201322786 A | 6/2013 |
| TW | 201349815 A | 12/2013 |
| TW | 201406107 A | 2/2014 |
| TW | 201534073 A | 9/2015 |
| TW | 201534074 A | 9/2015 |
| TW | 201538023 A | 10/2015 |
| TW | 201540029 A | 10/2015 |
| TW | 201540118 A | 10/2015 |
| TW | 201541889 A | 11/2015 |
| TW | 201541890 A | 11/2015 |
| TW | 201547248 A | 12/2015 |
| TW | 201547313 A | 12/2015 |
| TW | 201605191 A | 2/2016 |
| TW | 201605271 A | 2/2016 |
| TW | 201608863 A | 3/2016 |
| TW | 201622458 A | 6/2016 |
| TW | 201632022 A | 9/2016 |
| TW | I572160 B | 2/2017 |
| TW | I572173 B | 2/2017 |
| TW | I573413 B | 3/2017 |
| TW | I578733 B | 4/2017 |
| TW | I578837 B | 4/2017 |
| TW | I578838 B | 4/2017 |
| TW | I586120 B | 6/2017 |
| TW | I590692 B | 7/2017 |
| TW | 201728116 A | 8/2017 |
| TW | I642281 B | 11/2018 |
| TW | I642292 B | 11/2018 |
| WO | 2005053198 A2 | 6/2005 |
| WO | 2008118429 A1 | 10/2008 |
| WO | 2010118383 A1 | 10/2010 |
| WO | 2011025146 A2 | 3/2011 |
| WO | 2011068387 A2 | 6/2011 |
| WO | 2011153507 A2 | 12/2011 |
| WO | 2012057547 A2 | 5/2012 |
| WO | 2012106635 A1 | 8/2012 |
| WO | 2013055117 A2 | 4/2013 |
| WO | 2013058512 A1 | 4/2013 |
| WO | 2013077653 A1 | 5/2013 |
| WO | 2013089404 A1 | 6/2013 |
| WO | 2013165582 A1 | 11/2013 |
| WO | 2013191609 A1 | 12/2013 |
| WO | 2014066785 A1 | 5/2014 |
| WO | 2015031323 A1 | 3/2015 |
| WO | 2015076917 A1 | 5/2015 |
| WO | 2015076923 A1 | 5/2015 |
| WO | 2015076932 A1 | 5/2015 |
| WO | 2015077040 A1 | 5/2015 |
| WO | 2015077042 A1 | 5/2015 |
| WO | 2015077049 A1 | 5/2015 |
| WO | 2015077056 A1 | 5/2015 |
| WO | 2015077068 A1 | 5/2015 |
| WO | 2015077096 A1 | 5/2015 |
| WO | 2015077223 A1 | 5/2015 |
| WO | 2015113218 A1 | 8/2015 |
| WO | 2015127777 A1 | 9/2015 |
| WO | 2015130335 A1 | 9/2015 |
| WO | 2015130341 A1 | 9/2015 |
| WO | 2015171243 A1 | 11/2015 |
| WO | 2015195460 A1 | 12/2015 |
| WO | 2016010651 A1 | 1/2016 |
| WO | 2018010578 A1 | 1/2016 |

OTHER PUBLICATIONS

Jinyoung, Chun, "11-12-1388-00-0hew-ul-mu-transmission", IEEE Draft, (Nov. 11, 2013), 18 pgs.

Final Office Action issued in parent U.S. Appl. No. 16/256,842 on Oct. 27, 2021.

Office Action issued in parent U.S. Appl. No. 16/256,842 on May 13, 2021.

Office Action issued in parent U.S. Appl. No. 16/256,842 on Feb. 10, 2021.

Final Office Action issued in parent U.S. Appl. No. 16/256,842 on Nov. 12, 2020.

Office Action issued in parent U.S. Appl. No. 16/256,842 on Aug. 17, 2020.

Office Action issued in parent U.S. Appl. No. 16/256,842 on Apr. 17, 2020.

"ACKProtocol and Backoff Procedure for MU-MIMO", doc.: IEEE 802.11-10/1092r0, (Sep. 14, 2010), 15 pgs.

"Chinese Application Serial No. 201580018612.6, Office Action mailed Feb. 19, 2019", w/o English translation, 11 pgs.

"Uplinkmuiti-usertransmission", doc.: IEEE 11-13/1388r0, (Nov. 11, 2013), 18 pgs.

"Chinese Application Serial No. 201580018612.6, Response filed Nov. 19, 2019 to Office Action mailed Sep. 9, 2019", w English Claims, 11 pgs.

"Chinese Application Serial No. 201910217247, Voluntary Amendment filed Nov. 26, 2019", w English Claims, 18 pgs.

"Chinese Application Serial No. 201580018612.6, Response to Examiners Telephone Interview filed Dec. 5, 2019", w English Claims, 14 pgs.

"Chinese Application Serial No. 201710063899.5, Response filed Jan. 13, 2020 to Office Action mailed Aug. 27, 2019", w English Claims, 10 pgs.

Robert, Stacey, "Proposed TGac Draft Amendment; 11-10-1361-13-00ac-proposed-tgac-draft-amendment", IEEESA Mentor;11-10-1361-O3-00AC-Proposed-TGAC-Draft-Amendment, IEEE-SA Mentor, Piscataway, NJ USA,, (Jan. 19, 2011), 154 pgs.

Sean, Coffey, et al., "WWiSE complete proposal presentation; 11-04-0935-04-00n-wwise-complete-proposal-presentation", (Nov. 16, 2004), 66 pgs.

Simone, Merlin, "ACK protocol and backoff procedure for MU-MIMO; 11-10-1092-00-00ac-ack-protocol-and-backoff-procedure-for mu-mimo", IEEE Draft; 11-10-1 092-00-00AC-ACK-Protocol-And-Backoff-Procedure-For-MU-MIMO, IEEE-SA Mentor, Piscataway, NJ USA, val. 802.11 ac, (Sep. 14, 2010), 1-15.

Yunoki, Katsuo, et al., "Access Control Enhancement; 11-13-1073-01-0hew-access-3control-enhancement", IEEE Draft; 11-13-1073-01-0HEW-Access-Control-Enhancement. IEEE-SA Mentor. Piscataway. NJ USA. Vol. 802.11 HEW. No. 1, [Online], Retrieved from the internet :<https://mentor.ieee.org/802.11/documents?is_dcn=1073>, (Sep. 18, 2013), 1-9.

"Chinese Application Serial No. 201580018612.6, Response filed Jul. 5, 2019 to Office Action mailed Feb. 19, 2019", w English Claims, 27 pgs.

"Chinese Application Serial No. 201710063899.5, Office Action mailed Aug. 27, 2019", w Concise Statement of Relevance, 12 pgs.

"Chinese Application Serial No. 201580018612.6, Office Action mailed Sep. 9, 2019", w English Translation, 21 pgs.

(56) References Cited

OTHER PUBLICATIONS (Discussion on potential techniques for HEW, IEEE 802.11-130871 rO), (Jul. 15, 2013), 13 pgs.
"U.S. Appl. No. 14/458,000, Final Office Action mailed May 9, 2016", 11 pgs.
"U.S. Appl. No. 14/458,000, Non Final Office Action mailed Dec. 3, 2015", 16 pgs.
"U.S. Appl. No. 14/458,000, Notice of Allowance mailed Aug. 24, 2016", 11 pgs.
"U.S. Appl. No. 14/458,000, Response filed Mar. 3, 2015 to Non Final Office Action mailed Dec. 3, 2015", 15 pgs.
"U.S. Appl. No. 14/458,000, Response filed Aug. 8, 2016 to Final Office Action mailed May 9, 2016", 12 pgs.
"U.S. Appl. No. 14/459,385, Response filed May 4, 2016 to Non Final Office Action mailed Jan. 14, 2016", 9 pgs.
"U.S. Appl. No. 14/498,385, Advisory Action mailed Jan. 25, 2018", 3 pgs.
"U.S. Appl. No. 14/498,385, Advisory Action mailed Dec. 10, 2018", 3 pgs.
"U.S. Appl. No. 14/498,385, Examiner interview Summary mailed Jan. 19, 2018", 3 pgs.
"U.S. Appl. No. 14/498,385, Examiner Interview Summary mailed Jan. 20, 2017", 3 pgs.
"U.S. Appl. No. 14/498,385, Examiner interview Summary mailed Jul. 19, 2018", 3 pgs.
"U.S. Appl. No. 14/498,385, Examiner interview Summary mailed Aug. 2, 2017", 3 pgs.
"U.S. Appl. No. 14/498,385, 1131011106 Action mailed Aug. 11, 2016", 20 pgs.
"U.S. Appl. No. 14/498,385, Final Office Action mailed Sep. 5, 2018", 24 pgs.
"U.S. Appl. No. 14/498,385, Final Office Action mailed Nov. 15, 2017", 16 pgs.
"U.S. Appl. No. 14/498,385, Non Final Office Action mailed Jan. 14, 2016", 19 pgs.
"U.S. Appl. No. 14/498,385, Non Final Office Action mailed Mar. 9, 2017", 12 pgs.
"U.S. Appl. No. 14/498,385, Non Final Office Action mailed Apr. 6, 2018", 23 pgs.
"U.S. Appl. No. 14/498,385, Response filed Jan. 15, 2018 to Final Office Action mailed Nov. 15, 2017", 9 pgs.
"U.S. Appl. No. 14/498,385, Response filed Feb. 13, 2017 to Final Office Action mailed Aug. 11, 2016", 9 pgs.
"U.S. Appl. No. 14/498,385, Response filed Jul. 6, 2018 to Non Final Office Action mailed Apr. 6, 2018", 9 pgs.
"U.S. Appl. No. 14/498,385, Response filed Jul. 10, 2017 to Non Final Office Action mailed Mar. 9, 2017", 8 pgs.
"U.S. Appl. No. 14/498,385, Response filed Nov. 5, 2018 to Final Office Action mailed Sep. 5, 2018", 10 pgs.
"U.S. Appl. No. 15/280,782, Corrected Notice of Allowance mailed Sep. 27, 2017", 2 pgs.
"U.S. Appl. No. 15/280,782, Examiner interview Summary mailed Jul. 26, 2017", 3 pgs.
"U.S. Appl. No. 15/280,782, Non Final Office Action mailed May 12, 2017", 25 pgs.
"U.S. Appl. No. 15/280,782, Notice of Allowance mailed Sep. 8, 2017", 9 pgs.
"U.S. Appl. No. 15/280,782, Response filed Aug. 11, 2017 to Non Final Office Action mailed May 12, 2017", 12 pgs.
"U.S. Appl. No. 15/394,069, Examiner interview Summary mailed Jul. 28, 2017", 3 pgs.
"U.S. Appl. No. 15/394,069, Non Final Office Action mailed May 26, 2017", 18 pgs.
"U.S. Appl. No. 15/394,069, Notice of Allowance mailed Sep. 22, 2017", 8 pgs.
"U.S. Appl. No. 15/394,069, Response filed Aug. 23, 2017 to Non Final Office Action mailed May 26, 2017", 12 pgs.
"European Application No. 14864664.9, Extended European Search Report mailed Aug. 14, 2017", 6 pgs.
"European Application No. 14864664.9, Response filed Feb. 27, 2018 to Extended European Search Report mailed Aug. 14, 2017", 13 pgs.
"European Application Serial No. 14864664.9, Response filed Dec. 22, 2016 to Communication pursuant to Rules 161(2) and 162 EPC mailed Jun. 28, 2016", 4 pgs.
"European Application Serial No. 15789579.8, Response filed Jun. 12, 2018 to Extended European Search Report mailed Nov. 24, 2017", 10 pgs.
"European Application Serial No. 17153414.2, Extended European Search Report mailed May 3, 2017", 8 pgs.
"International Application Serial No. PCT/US2014/065166, International Preliminary Report on Patentability mailed Jun. 2, 2016", 8 pgs.
"International Application Serial No. PCT/US2014/085166, International Search Report mailed Jan. 22, 2015", 3 pgs.
"International Application Serial No. PCT/US2014/065188, Written Opinion mailed Jan. 22, 2015", 6 pgs.
"International Application Serial No. PCT/US2015/024889, International Preliminary Report on Patentability mailed Nov. 17, 2016", 13 pgs.
"International Application Serial No. PCT/US2015/024889, International Search Report mailed Jun. 29, 2015", 3 pgs.
"International Application Serial No. PCT/US2015/024889, Written Opinion mailed Jun. 29, 2015", 11 pgs.
"Taiwanese Application Serial No. 104108807, Office Action mailed May 26, 2016",W/English Search Report, 10 pgs.
"Taiwanese Application Serial No. 104108807, Response filed Nov. 25, 2016 Office Action mailed May 26, 2016", W/English Claims, 65 pgs.
"Taiwanese Application Serial No. 104110914, Response filed Sep. 10, 2016 to Office Action mailed Mar. 28, 2016", W/English Claims, 98 pgs.
"Taiwanese Application Serial No. 105139521, Office Action mailed Apr. 27, 2018", w/English Translation, 4 pgs.
"Taiwanese Application Serial No. 105139522, Response filed May 11, 2018 to Office Action mailed Jan. 5, 2018", W/English Claims, 73 pgs.
Choi, Jinsoo, Discussion on OFDMA in HEW, in: IEEE P802.11—High Efficiency WLAN Study Group, [Online] Retrieved from the internet: <http://www.ieee802.org/11/Reports/hew_update.htm>, (Nov. 11, 2013), 11 pgs.
Chun, Jinyoung, et al., "Legacy Support on HEW frame structure", IEEE 11-13/1057rO, (Sep. 16, 2013), 8 pgs.
Jinyoung, Chun, et al., "Legacy Support on HEW frame structure", IEEE, 11-13/1 G57r0, [Online] Retrieved from the Internet: <http://www.ieee802.org/11/Reports/hew_update.html>, (Sep. 16, 2013), 8 pgs.
Koskela, Timo, et al., Discussion on Potential Techniques for HEW, In: IEEE P802.11—High Efficiency WLAN Study Group, [Online] Retrieved from the Internet: <http://www.ieee802.org/11/Reports/hew_update.html>, (Jul. 15, 2013), 13 pgs.
"11ah Preamble for 2Mhz and Beyond", IEEE Submission No. IEEE 802. 1-11/1483r2, 1-24.
"U.S. Appl. No. 14/304,041, Notice of Allowance mailed Oct. 8, 2015", 8 pgs.
"U.S. Appl. No. 14/304,041, Supplemental Notice of Allowability mailed Nov. 4, 2015", 5 pgs.
"U.S. Appl. No. 14/315,562, Examiner interview Summary mailed Jun. 20, 2016", 2 pgs.
"U.S. Appl. No. 14/315,562, Final Office Action mailed Mar. 21, 2016", 16 pgs.
"U.S. Appl. No. 14/315,562, Non Final Office Action mailed Sep. 25, 2015", 14 pgs.
"U.S. Appl. No. 14/315,562, Notice of Allowability mailed Jun. 20, 2016", 7 pgs.
"U.S. Appl. No. 14/315,562, Notice of Allowance mailed Jun. 6, 2016", 12 pgs.
"U.S. Appl. No. 14/315,562, Response filed May 16, 2016 to Final Office Action mailed Mar. 21, 2016", 10 pgs.
"U.S. Appl. No. 14/315,562, Response filed Dec. 28, 2015 to Non Final Office Action mailed Sep. 25, 2015", 9 pgs.

(56) References Cited

OTHER PUBLICATIONS

"U.S. Appl. No. 14/338,137, Corrected Notice of Allowance mailed Jan. 22, 2016", 10 pgs.
"U.S. Appl. No. 14/338,137, Notice of Allowance mailed Nov. 25, 2015", 14 pgs.
"U.S. Appl. No. 14/341,055, Examiner Interview Summary mailed Apr. 18, 2017", 3 pgs.
"U.S. Appl. No. 14/341,055, Non Final Office Action mailed Nov. 14, 2016", 10 pgs.
"U.S. Appl. No. 14/341,055, Notice of Allowance mailed Jul. 25, 2017", 10 pgs.
"U.S. Appl. No. 14/341,055, Response filed Apr. 14, 2017 to Non Final Office Action mailed Nov. 14, 2016", 11 pgs.
"U.S. Appl. No. 14/447,254, Advisory Action mailed Feb. 13, 2017", 4 pgs.
"U.S. Appl. No. 14/447,254, Examiner Interview Summary mailed Jan. 18, 2017", 3 pgs.
"U.S. Appl. No. 14/447,254, Examiner interview Summary mailed Jul. 22, 2016", 4 pgs.
"U.S. Appl. No. 14/447,254, Final Office Action mailed Sep. 14, 2016", 13 pgs.
"U.S. Appl. No. 14/447,254, Non Final Office Action mailed Mar. 31, 2016", 13 pgs.
"U.S. Appl. No. 14/447,254, Response filed Jan. 17, 2017 Final Office Action mailed Sep. 14, 2016", 11 pgs.
"U.S. Appl. No. 14/447,254, Response filed Aug. 1, 2016 to Non Final Office Action mailedMar. 31, 2016", 12 pgs.
"U.S. Appl. No. 14/563,406, Advisory Action mailed Jan. 23, 2017", 3 pgs.
"U.S. Appl. No. 14/563,406, Corrected Notice of Allowance mailed Jun. 14, 2017", 2 pgs.
"U.S. Appl. No. 14/563,406, Examiner Interview Summary mailed Jan. 18, 2017", 3 pgs.
"U.S. Appl. No. 14/563,406, Examiner interview Summary mailed Jul. 26, 2016", 3 pgs.
"U.S. Appl. No. 14/563,406, Final Office Action mailed Aug. 9, 2016", 15 pgs.
"U.S. Appl. No. 14/563,406, Non Final Office Action mailed Apr. 26, 2016", 12 pgs.
"U.S. Appl. No. 14/563,406, Notice of Allowance mailed Mar. 7, 2017", 7 pgs.
"U.S. Appl. No. 14/563,406, Response filed Jan. 9, 2017 to Final Office Action mailed Aug. 9, 2016", 9 pgs.
"U.S. Appl. No. 14/563,406, Response filed Jul. 26, 2016 to Non Final Office Action mailed Apr. 26, 2016", 9 pgs.
"U.S. Appl. No. 14/573,912, Non Final Office Action mailed Jun. 16, 2016", 7 pgs.
"U.S. Appl. No. 14/573,912, Notice of Allowability mailed Jan. 13, 2017", 4 pgs.
"U.S. Appl. No. 14/573,912, Notice of Allowability mailed May 11, 2017", 2 pgs.
"U.S. Appl. No. 14/573,912, Notice of Allowability mailed Dec. 9, 2016", 2 pgs.
"U.S. Appl. No. 14/573,912, Notice of Allowance mailed Nov. 3, 2016", 7 pgs.
"U.S. Appl. No. 14/573,912, Response filed Oct. 17, 2016 to Non Final Office Action mailed Jun. 16, 2016", 11 pgs.
"U.S. Appl. No. 14/977,405, Examiner interview Summary mailed Jul. 25, 2016", 3 pgs.
"U.S. Appl. No. 14/977,405, Final Office Action mailed Aug. 24, 2016", 8 pgs.
"U.S. Appl. No. 14/977,405, Non Final Office Action mailed Feb. 26, 2016", 7 pgs.
"U.S. Appl. No. 14/977,405, Notice of Allowance mailed Nov. 18, 2016", 8 pgs.
"U.S. Appl. No. 14/977,405, Preliminary Amendment filed Dec. 22, 2015", 11 pgs.
"U.S. Appl. No. 14/977,405, Response filed Jul. 20, 2016 to Non Final Office Action mailed Feb. 26, 2016", 11 pgs.
"U.S. Appl. No. 14/977,405, Response filed Oct. 24, 2016 to Final Office Action mailed Aug. 24, 2016", 11 pgs.
"U.S. Appl. No. 15/023,262, Examiner interview Summary mailed Oct. 11, 2017", 3 pgs.
U.S. Appl. No. 15/023,262, Non Final Office Action mailed Jul. 11, 2017, 14 pgs.
"U.S. Appl. No. 15/023,262, Notice of Allowance mailed Dec. 21, 2017", 8 pgs.
"U.S. Appl. No. 15/023,262, Response filed Oct. 10, 2017 to Non Final Office Action mailed Jul. 11, 2017", 11 pgs.
"U.S. Appl. No. 15/023,581, Non Final Office Action mailed Jan. 17, 2017", 10 pgs.
"U.S. Appl. No. 15/023,581, Notice of Allowance mailed Jul. 27, 2017", 8 pgs.
"U.S. Appl. No. 15/023,581, Preliminary Amendment filed Mar. 21, 2016", 3 pgs.
"U.S. Appl. No. 15/023,581, Response filed Apr. 11, 2017 to Non Final Office Action mailed Jan. 17, 2017", 15 pgs.
"U.S. Appl. No. 15/025,634, Response filed Jan. 25, 2018 to Non Final Office Action mailed Oct. 27, 2017", 13 pgs.
"U.S. Appl. No. 15/025,634, Non Final Office Action mailed Oct. 27, 2017", 21 pgs.
"U.S. Appl. No. 15/025,634, Preliminary Amendment filed Mar. 29, 2016", 9 pgs.
"U.S. Appl. No. 15/026,022, Corrected Notice of Allowance mailed Dec. 13, 2017", 2 pgs.
"U.S. Appl. No. 15/026,022, Examiner interview Summary mailed Sep. 7, 2017", 3 pgs.
"U.S. Appl. No. 15/026,022, Non Final Office Action mailed Jul. 18, 2017", 7 pgs.
"U.S. Appl. No. 15/026,022, Notice of Allowance mailed Oct. 11, 2017", 5 pgs.
"U.S. Appl. No. 15/026,022, Preliminary Amendment mailed Mar. 30, 2016", 9 pgs.
"U.S. Appl. No. 15/026,022, Response filed Sep. 7, 2017 to Non Final Office Action mailed Jul. 18, 2017", 9 pgs.
"U.S. Appl. No. 15/052,600, Corrected Notice of Allowance mailed Jun. 24, 2016", 7 pgs.
"U.S. Appl. No. 15/052,600, Corrected Notice of Allowance mailed Aug. 5, 2016", 7 pgs.
"U.S. Appl. No. 15/052,600, Notice of Allowance mailed May 20, 2016", 10 pgs.
"U.S. Appl. No. 15/052,600, Preliminary Amendment filed Apr. 1, 2016", 10 pgs.
"U.S. Appl. No. 15/113,214, Non Final Office Action mailed Nov. 2, 2017", 11 pgs.
U.S. Appl. No. 15/113,214, Response filed Jan. 26, 2018 to Non Final Office Action.
"U.S. Appl. No. 15/113,214, Response filed Oct. 6, 2017 to Restriction Requirement mailed Aug. 10, 2017", 9 pgs.
"U.S. Appl. No. 15/113,214, Restriction Requirement mailed Aug. 10, 2017", 6 pgs.
"U.S. Appl. No. 15/263,864, Corrected Notice of Allowance mailed Dec. 14, 2017", 6 pgs.
"U.S. Appl. No. 15/263,864, Final Office Action mailed Sep. 21, 2017", 19 pgs.
"U.S. Appl. No. 15/263,864, Non Final Office Action mailed Mar. 10, 2017", 4 pgs.
"U.S. Appl. No. 15/263,864, Notice of Allowance mailed Nov. 9, 2017", 7 pgs.
"U.S. Appl. No. 15/263,864, Response filed Jun. 9, 2017 to Non Final Office Action mailed Mar. 10, 2017", 9 pgs.
"U.S. Appl. No. 15/263,864, Response Filed Oct. 18, 2017 to Final Office Action mailed Sep. 21, 2017", 11 pgs.
"U.S. Appl. No. 15/280,782, Corrected Notice of Allowance mailed Nov. 3, 2017", 2 pgs.
"U.S. Appl. No. 15/394,069, Corrected Notice of Allowance mailed Nov. 9, 2017", 2 pgs.
"U.S. Appl. No. 15/644,937, Preliminary Amendment filed Aug. 30, 2017", 8 pgs.
"U.S. Appl. No. 15/801,680, Preliminary Amendment filed Dec. 21, 2017", 10 pgs.

(56) References Cited

OTHER PUBLICATIONS

"Chinese Application Serial No. 201480056246.9, Office Action mailed Sep. 29, 2018", W/English Translation, 23 pgs.
"Chinese Application Serial No. 201480056246.9, Response Filed Feb. 14, 2019 to Office Action mailedSep. 29, 2018", w/English Claims, 19 pgs.
"Chinese Application Serial No. 201580025791.6, Voluntary Amendment filed on Jun. 21, 2017", (W English Claims), 16 pgs.
"Chinese Application Serial No. 201580079973.7, Voluntary Amendment filed on Jun. 15, 2017", (W/ English Translation), 12 pgs.
"Chinese Application Serial No. 201710063899.5, Voluntary Amendment Filed on Oct. 20, 2017", (W English Claims), 23 pgs.
"European Application Serial No. 14863133.6, Extended European Search Report mailed Jul. 3, 2017", 10 pgs.
"European Application Serial No. 14863133.6, Response Filed Jan. 17, 2018to Extended European Search Report mailed Jul. 3, 2017", 12 pgs.
"European Application Serial No. 14863142.7, Extended European Search Report mailed May 3, 2017", 7 pgs.
"European Application Serial No. 14863142.7, Response Filed Nov. 15, 2017 to Extended European Search Report mailed May 3, 2017", 13 pgs.
"European Application Serial No. 14863362.1, Extended European Search Report mailed Jul. 18, 2017", 8 pgs.
"European Application Serial No. 14863362.1, Response filed Dec. 20, 2016 to Communication pursuant to Rules 161 (2) and 162 EPC mailed Jun. 28, 2016", 21 pgs.
"European Application Serial No. 14864107.9, Extended European Search Report, mailed Jul. 27, 2017", 13 pgs.
"European Application Serial No. 14864636,7, Extended European Search Report mailed Jul. 21, 2017", 8 pgs.
"European Application Serial No. 148646 8 0.5, Extended European Search Report mailed Jul. 18, 2017", 11 pgs.
"European Application Serial No. 14883581.2, Extended European Search Report mailed Sep. 29, 2017", 9 pgs.
"European Application Serial No. 14883772,7, Communication of European publication number and information on the application of Article 67(3) mailed Dec. 7, 2016", 1 pg.
"European Application Serial No. 14883772.7, Extended European Search Report mailed Oct. 12, 2017", 7 pgs.
"European Application Serial No. 15789579.8, Communication Pursuant to Article 94(3) EPC mailed Nov. 2, 2018", 4 pgs.
"European Application Serial No. 15789579.8, Extended European Search Report mailed Nov. 24, 2017", 6 pgs.
"European Application Serial No. 15821605.1, Response Filed Sep. 4, 2017 to Communication Pursuant to Rules 161 (2) and 162 EPC", 11 pgs.
"European Application Serial No. 16168650.6, Communication Pursuant to Article 94(3) EPC mailed Aug. 2, 2017", 5 pgs.
"European ApplicationSerial No. 16168650.6, Extended European Search Report mailed Sep. 7, 2016", 12 pgs.
"European Application Serial No. 16168650.6, Response Filed Nov. 13, 2017 to Communication Pursuant to Article 94(3) EPC mailed Aug. 2, 2017", 10pgs.
"Further evaluation on outdoor Wi-Fi; 11-13-0843-00-0hew-further-evaluation-on-outdoor-wi-fi", Wookbong Lee (LG Electronics): IEEE SA Mentor; 11-13-0843-00-0HEW-Further-Evaluation-On-Outdoor-Wi-Fi, IEEE-SA Mentor, Piscataway, NJ USA, (Jul. 15, 2013), 18 pgs.
"Guard interval estimation considering switch time and propagation delay", R1-134362 3GPP TSG RAN WG1 Meeting #74bis, (Oct. 2013), 4 pgs.
"HEWSG PHY Considerations for Outdoor Environment; 11-13-0536-00-0hew-hew-sg-phy-considerations-for-outdoor-environment", Wookbong Lee (LG Electronics): IEEE SA Mentor; 11-13-0536-00-0HEW-HEW-SG-PHY-C0nsiderations-For-Outdoor-Environment, IEEE-SA Mentor, Piscataway, NJ USA,, (May 13, 2013), 21 pgs.
"IEEE Standard 802.11b-1999", (1999), 1-89.

"IEEE Standard for Information technology—Telecommunications and information exchange between systems—Local and metropolitan area networks—Specific Requirements Part 11: Wireless LAN Medium Access Control (MAC) and Physical Layer (PHY) Specifications", IEEE Computer Society, (2009), 538 pgs.
"IEEE Standard for information technology—Telecommunications and information exchange between systems—Local and metropolitan area network—Specific Requirements Part 11: Wireless LAN Medium Access Control (MAC) and Physical Layer (PHY) Specifications", IEEE Computer Society, (2013), 425 pgs.
"Indian Application Serial No. 201647013626, Voluntary Amendment filed Aug. 4, 2016", 15 pgs.
"Indian Application Serial No. 201647013652, Preliminary Amendment mailed Aug. 4, 2016", 11 pgs.
"Indian Application Serial No. 201647013653, Preliminary Amendment filed Aug. 8, 2016", 18 pgs.
"Indian Application Serial No. 201647039642, Preliminary Amendment filed Jan. 5, 2017", 5 pgs.
"International Application Serial No. PCT/CN2014/086532, International Search Report mailed Dec. 17, 2014", 4 pgs.
"International Application Serial No. PCT/CN2014/086532, Written Opinion mailed Dec. 17, 2014", 4 pgs.
"International Application Serial No. PCT/US2014/044881, International Preliminary Report on Patentability mailed Sep. 9, 2016", 9 pgs.
"International Application Serial No. PCT/US2014/044881, International Search Report mailed Nov. 24, 2014", 3 pgs.
"International Application Serial No. PCT/US2014/044881, Written Opinion mailed Nov. 24, 2014", 7 pgs.
"International Application Serial No. PCT/US2014/053451, International Preliminary Report on Patentability mailed Sep. 9, 2016", 6 pgs.
"International Application Serial No. PCT/US2014/053451, International Search Report mailed Dec. 10, 2014", 3 pgs.
"International Application Serial No. PCT/US2014/053451, Written Opinion mailed Dec. 10, 2014", 4 pgs.
"International Application Serial No. PCT/US2014/055996, International Preliminary Report on Patentability mailed Jun. 2, 2016", 7 pgs.
"International Application Serial No. PCT/US2014/055996, International Search Report mailed Dec. 17, 2014", 3 pgs.
"International Application Serial No. PCT/US2014/055996, Written Opinion mailed Dec. 17, 2014", 5 pgs.
"International Application Serial No. PCT/US2014/056819, International Preliminary Report on Patentability mailed Jun. 2, 2016", 8 pgs.
"International Application Serial No. PCT/US2014/056819, International Search Report mailed Dec. 31, 2014", 3 pgs.
"International Application Serial No. PCT/US2014/056819, Written Opinion mailed Dec. 31, 2014", 6 Pgs.
"International Application Serial No. PCT/US2014/057751, International Preliminary Report on Patentability mailed Jun. 2, 2016", 7 pgs.
"International Application Serial No. PCT/US2014/057751, International Search Report mailed Jan. 5, 2015", 3 pgs.
"International Application Serial No. PCT/US2Q14/057751, Written Opinion mailed Jan. 5, 2015", 5 pgs.
"International Application Serial No. PCT/US2014/064340, International Preliminary Report on Patentability mailed Jun. 2, 2016", 8 pgs.
"International Application Serial No. PCT/US2Q14/064340, International Search Report mailed Feb. 16, 2015", 3 pgs.
"International Application Serial No. PCT/US2014/064340, Written Opinion mailed Feb. 16, 2015", 6 pgs.
"International Application Serial No. PCT/US2014/064350, International Preliminary Report on Patentability mailed Jun. 2, 2016", 7 pgs.
"International Application Serial No. PCT/US2014/064350, International Search Report mailed Feb. 6, 2015", 4 pgs.
"International Application Serial No. PCT/US2014/064350, Written Opinion mailed Feb. 6, 2015", 5 pgs.

(56) References Cited

OTHER PUBLICATIONS

"International Application Serial No. PCT/US2014/064509, International Preliminary Report on Patentability mailed Jun. 2, 2016", 10 pgs.
"International Application Serial No. PCT/US2014/064509, International Search Report mailed Feb. 11, 2015", 3 pgs.
"International Application Serial No. PCT/US2014/064509, Written Opinion mailed Feb. 11, 2015", 8 pgs.
"International Application Serial No. PCT/US2014/064599, International Preliminary Report on Patentability mailed Jun. 2, 2016", 9 pgs.
"International Application Serial No. PCT/US2014/064599, International Search Report mailed Feb. 26, 2015", 3 pgs.
"International Application Serial No. PCT/US2014/084599, Written Opinion mailed Feb. 26, 2015", 7 pgs.
"International Application Serial No. PCT/US2014/064787, International Preliminary Report on Patentability mailed Aug. 2, 2018", 10 pgs.
"International Application Serial No. PCT/US2014/084767, International Search Report mailed Feb. 26, 2015", 8 pgs.
"International Application Serial No. PCT/US2014/064787, Written Opinion mailed Feb. 26, 2015", 8 pgs.
"International Application Serial No. PCT/US2014/066133, International Preliminary Report on Patentability mailed Jun. 2, 2016", 9 pgs.
"International Application Serial No. PCT/US2014/086133, International Search Report mailed Feb. 24, 2015", 3 pgs.
"International Application Serial No. PCT/US2014/068133, Written Opinion mailed Feb. 24, 2015", 7 pgs.
"International Application Serial No. PCT/US2014/071942, International Preliminary Report on Patentability mailed Feb. 2, 2017", 9 pgs.
"International Application Serial No. PCT/US2014/071942, International Search Report mailed Apr. 17, 2015", 3 pgs.
"International Application Serial No. PCT/US2014/071942, Written Opinion mailed Apr. 17, 2015", 7 pgs.
"International Application Serial No. PCT/US2015/035114, International Preliminary Report on Patentability mailed Jan. 26, 2017", 10 pgs.
"International Application Serial No. PCT/US2015/035114, International Search Report mailed Oct. 19, 2015", 3 pgs.
"International Application Serial No. PCT/US2015/035114, Written Opinion mailed Oct. 19, 2015", 8 pgs.
"International Application Serial No. PCT/US2015/035313, International Search Report mailed Sep. 25, 2015", 4 pgs.
"International Application Serial No. PCT/US2015/035313, Written Opinion mailed Sep. 25, 2015", 8 pgs.
"Mexican Application Serial No. MX/a/2016/018738", W/Concise Statement of Relevance, 9 pgs.
"Part 11: Wireless LAN Medium Access Control (MAC) and Physical Layer (PHY) Specifications Part 1 of 2". IEEE Computer Society IEEE Std 802.11-2016 (Revision of IEEE Std 802.11-2012), (2016), 2000.
"Part 11: Wireless LAN Medium Access Control (MAC) and Physical Layer (PHY) Specifications Part 2 of 2", IEEE Computer Society IEEE Std 802.11-2016 (Revision of IEEE Std 802.11-2012), (2016), 1535.
"Taiwanese Application Serial No. 104101656, Office Action mailed Mar. 21, 2016" W/English Search Report, 7 pgs.
"Taiwanese Application Serial No. 104101656, Response filed Sep. 22, 2016 to Office Action mailed Mar. 21, 2016", W/ English Claims, 43 pgs.
"Taiwanese Application Serial No. 104101789, Office Action mailed Mar. 25, 2016", w/English Claims, 18 pgs.
"Taiwanese Application Serial No. 104101789, Response filed Sep. 23, 2016 to Office Action mailed Mar. 25, 2016", w/English Claims, 61 pgs.
"Taiwanese Application Serial No. 104101790, Office Action mailed Apr. 21, 2016", w/English Claims, 12 pgs.
"Taiwanese Application Serial No. 104101790, Response filed Jul. 22, 2016to Office Action mailed Apr. 21, 2016", W/English Claims, 10 pgs.
"Taiwanese Application Serial No. 104106272, Office Action mailed Apr. 18, 2016",w/ English Claims, 15 pgs.
"Taiwanese Application Serial No. 104106272, Response filed Oct. 14, 2016 to Office Action mailed Apr. 18, 2016", W/English Claims, 45 pgs.
"Taiwanese Application Serial No. 104106275, Office Action mailed Jun. 8, 2016", W/Machine Translation, 5 pgs.
"Taiwanese Application Serial No. 104106275, Response filed Sep. 6, 2016 to Office Action mailed Jun. 8, 2016", W/English Claims, 80 pgs.
"Taiwanese Application Serial No. 104108803, Office Action mailed Jul. 1, 2016", w/English Claims, 16 pgs.
"Taiwanese Application Serial No. 104108803, Response filed Jan. 3, 2017 to Office Action mailed Jul. 1, 2016", w/English Claims, 8 pgs.
"Taiwanese Application Serial No. 104110914, Office Action mailed Mar. 28, 2016", w/English Claims, 14 pgs.
"Taiwanese Application Serial No. 104113863, Office Action mailed Jun. 6, 2016", W/Concise Statement of Relevance, 6 pgs.
"Taiwanese Application Serial No. 104113863, Response filed Aug. 30, 2016 to Office Action mailed Jun. 6, 2016", W/English Claims, 76 pgs.
"Taiwanese Application Serial No. 104117983, Office Action mailed Jul. 28, 2016", w/Concise Statement of Relevance, 6 pgs.
"Taiwanese Application Serial No. 104117983, Response filed Jan. 16, 2017 to Office Action mailed Jul. 28, 2016", (W/English Translation), 87 pgs.
"Taiwanese Application Serial No. 104118345, Office Action mailed May 10, 2017", W/English Translation, 9 pgs.
"Taiwanese Application Serial No. 104118345, Response filed Nov. 10, 2017 to Office Action mailed May 10, 2017", (W/English Claims), 68 pgs.
"Taiwanese Application Serial No. 104118345, Response filed Dec. 22, 2017 to Examiner Interview", (W/English Claims), 52 pgs.
"Taiwanese Application Serial No. 104118504, Office Action mailed Apr. 21, 2017", W/English Claims, 19 pgs.
"Taiwanese Application Serial No. 104118504, Office Action mailed Jul. 21, 2016", W/English Translation, 18 pgs.
"Taiwanese Application Serial No. 104118504, Response Filed Jul. 20, 2017 to Office Action mailed Apr. 21, 2017", (W/English Claims), 13 pgs.
"Taiwanese Application Serial No. 104118504, Response filed Oct. 18, 2016to Office Action mailed Jul. 21, 2016", W/English Claims, 104 pgs.
"Taiwanese Application Serial No. 104122567, Office Action mailed Jun. 27, 2017", (W/English Translation), 5 pgs.
"Taiwanese Application Serial No. 104122567, Office Action mailed Oct. 13, 2016", W/English Search Report, 8 pgs.
"Taiwanese Application Serial No. 104122567, Response Filed Apr. 13, 2017 to Office Action mailed Oct. 13, 2016", w/Concise Statement of Relevance, 10 pgs.
"Taiwanese Application Serial No. 104122567, Response Filed Dec. 22, 2017 to Office Action mailed Jun. 27, 2017", (W/English Claims), 134 pgs.
Taiwanese Application Serial No. 105113980, Office Action mailed Jul. 21, 2016n,W/English Claims, 18 pgs.
"Taiwanese Application Serial No. 105113980, Response filed Oct. 24, 2016 to Office Action mailed Jul. 21, 2016", W/English Claims, 80 pgs.
"Taiwanese Application Serial No. 105139521, Response filed Jul. 31, 1810 Office Action mailed Apr. 27, 2018", W/English Claims, 55 pgs.
"Taiwanese Application Serial No. 105139522, Office Action mailed Jan. 5, 2018", w/English Translation, 4 pgs.
"VHDL Implementation of Reconfigurable Multimode Block Interleaver for OFDM Based WLAN", IJARECE, vol. 1, [Online]. Retrieved from the Internet: <http://ijarece.org/>, (Oct. 2012), 82-84 pgs.
Chun, Jinyoung. et al . . . "Uplinkmuiti-usertransmission", In: IEEEP802.11—High Efficiency WLAN Study Group, (Nov. 11, 2013), 18 pgs.

(56) References Cited

OTHER PUBLICATIONS

Dave, Hedberg. et al., "Adjacent Channel Interference and Filtering for 56-carrier Signals; 11-04-1579-01-000n-11-04-1579-00-000n-aci-results", (Jan. 17, 2005), 1-26 pgs.

Hiertz, Guido R, et al., Proposed direction and priorities for HEW, In: IEEE P802.11—High Efficiency WLAN Study Group, (Nov. 12, 2013), 17 pgs.

Hongyuan, Zhang, "11ah preamble for 2MHz and beyond ;11-11-1483-02-00ah-11ah-preamble-for-2 mhzand-beyond", IEEE Draft; 11-11-1483-02-00AH-11AH-Preamble-For-2MHZAND-Beyond, IEEE-SA Mentor, Piscataway, NJ USA, vol. 802.11 ah, No. 2, (Jan. 16, 2012), 1-24.

Jianhan, Liu, "Summary and Discussions of Proposals on Potential PHY Technologies in HEW 11-13-1375-01-Ohew-summary-and-discussions-of-proposals-on-potential-phytechnologies-in-hew", IEEE Draft: 11-13-1375-01-OHEW-Summary-And-Discussions-Of-Proposals-On-Potential-PHY-Technologies-In-HEW, IEEE-SA Mentor, Piscataway, NJ USA, vol. 802.11 HEW, No. 1,, (Nov. 12, 2013), 1-15.

Jinsoo, Choi, "Discussion on OFDMA in HEW; 11-13-1382-00-0hew-discussion-on-ofdma-inhew". (LG Electronics): IEEE Draft; 11-13-1382-00-0HEW-Discussion-On-OFDMA-In-HEW, IEEE-SA Mentor, Piscataway, NJ USA vol. 802.11 HEW, (Nov. 12, 2013), 1-11.

Jinyoung, Chun, "UL MU transmission 11-13-1388-00-Ohew-ul-mu-transmission", IEEE Draft; 11-13-1388-OO-OHEW-UL-MU-Transmission, IEEE-SA. Mentor, Piscataway, NJ USA. val. 802.11 HEW, (Nov. 11, 2013), 1-18.

Oh, Jinhyung, et al., "Distributed implicit interference alignment in 802.11 ac WLAN network", International Conference on ICT Convergence (ICTC), Oct. 2013), 421-426.

Raja, Banerjea, "A simplified STR Mechansim—MAC 11-14-0340-00-0hew-a-simplified-str-mechansim mac", IEEE Draft, 11-14-0340-00-OHEW-A-Simplified-STR-Mechanism-MAC, IEEE-SAMentor, Piscataway, NJ USA, vol. 802.11 HEW, (Mar. 16, 2014), 13 pgs.

Robert, Stacey, "Proposed Specification Framework for TGac; 11-09-0992-21-00ac proposed-specification-framework for tgac", IEEE SA Mentor, 11-09-0992-21-00AC-Proposed-Specificationframework-For-TGac,IEEE-SAMentor, Piscataway, NJ USA, vol. 802.11ac, No. 21, (Dec. 9, 2009), 1-5 pgs.

* cited by examiner

METHOD, APPARATUS, AND COMPUTER READABLE MEDIA FOR ACKNOWLEDGEMENT IN WIRELESS NETWORKS

PRIORITY CLAIM

This application is a continuation of U.S. application Ser. No. 16/256,842 filed on Jan. 24, 2019, which is a continuation of U.S. patent application Ser. No. 14/498,385, filed Sep. 26, 2014 (abandoned), which claims priority under 35 U.S.C. 119(e) to United States Provisional Patent Application Ser. No. 61/990,414, filed May 8, 2014, each of which is incorporated herein by reference in its entirety.

TECHNICAL FIELD

Embodiments pertain to wireless communications. Some embodiments relate to block acknowledgements in wireless networks.

BACKGROUND

One issue with communicating data over a wireless network is acknowledging received data. Often acknowledging received data consumes bandwidth. Moreover, with the use of some protocols, a large number of stations may be transmitting simultaneously in both the spatial domain and time domain. Additionally, consumers often demand more and more bandwidth for their applications.

Thus, there are general needs for systems, apparatus, and methods that reduce signaling, bandwidth, and delay associated with communicating smaller amounts of data.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
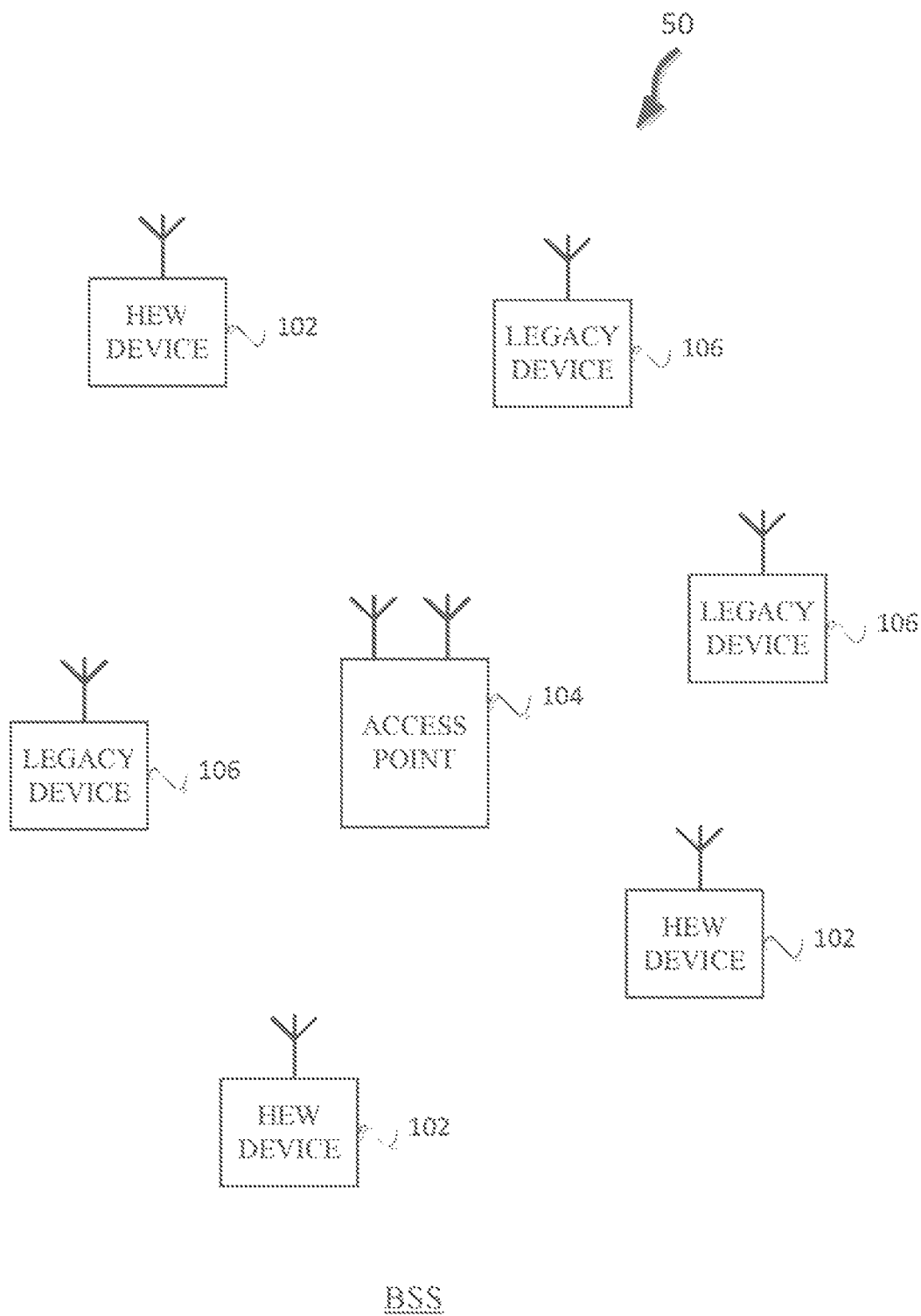
FIG. 1 illustrates a wireless network, in accordance with some embodiments.

FIG. 1 illustrates a wireless network, in accordance with some embodiments. The wireless network may comprise a basis service set (BSS) 50 that may include an access point (AP) 104, a plurality of high-efficiency wireless or Wi-Fi (HEW) (e.g., Institute of Electrical and Electronics Engineers IEEE 802.11ax) devices, and a plurality of legacy (e.g., IEEE 802.11n/ac) devices 106.

The AP 104 may be an AP and use 802.11 to transmit and receive. The AP 104 may be a base station. The AP 104 may use other communications protocols as well as the 802.11 protocol. The 802.11 protocol may be 802.11ax. The 802.11 protocol may include using Orthogonal Frequency-Division Multiple Access (OFDMA). The 802.11 may include using multi-user multiple-input and multiple-output (MU-MIMO).

The HEW devices 102 may be wireless transmit and receive devices such as cellular telephones, handheld wireless devices, wireless glasses, wireless watches, wireless personal devices, tablets, or another devices that may be transmitting and receiving using an 802.11 protocol such as 802.11ax or another wireless protocol.

The BSS 50 may operate on a primary channel and one or more secondary channels or sub-channels. The BSS 50 may include one or more APs 104. In accordance with embodiments, the AP 104 may communicate with one or more of the HEW devices 102 on one or more of the secondary channels or sub-channels or the primary channel. In example embodiments, the AP 104 communicates with the legacy devices 106 on the primary channel. In example embodiments, the AP 104 may be configured to communicate concurrently with one or more of the HEW devices 102 on one or more of the secondary channels and a legacy device 106 utilizing only the primary channel and not utilizing any of the secondary channels.

The AP 104 may communicate with legacy devices 106 in accordance with legacy IEEE 802.11 communication techniques. In example embodiments, the AP 104 may also be configured to communicate with HEW devices 102 in accordance with legacy IEEE 802.11 communication techniques. Legacy IEEE 802.11 communication techniques may refer to any IEEE 802.11 communication technique prior to IEEE 802.11ax.

In some embodiments, HEW frames may be configurable to have the same bandwidth or different bandwidths, and the bandwidth may be one of 20 MHz, 40 MHz, 80 MHz or 160 MHz contiguous bandwidths or an 80+80 MHz non-contiguous bandwidth. In some embodiments, a 320 MHz contiguous bandwidth may be used. In some embodiments, bandwidths of 1 MHz, 1.25 MHz, 2.5 MHz, 5 MHz and 10 MHz or a combination thereof may also be used. In these embodiments, a HEW frame may be configured for transmitting a number of spatial streams.

In example embodiments, referring to FIGS. 2 through 9, the AP 104 is configured to transmit and/or receive signal fields (SIGs) 120, 220, 320, 420, and 520; DATA 122, 222, 322, 422, and 522; (multi-user block acknowledgment requests (MU BAR) 323, 423, and 523; block acknowledgement request (BAR) 223; (block acknowledgement) BACK 226, 326, 426, and 526; frames 600 and 700; and, BACK 126.

In example embodiments the HEW device 102 is configured to transmit and/or receive SIGs 120, 220, 320, 420, and 520; DATA 122, 222, 322, 422, and 522; MU BAR 323, 423, and 523; BAR 223; BACK 226, 326, 426, and 526; frames 600 and 700; and, ACK 126. In example embodiments, the HEW device 102 is station (STA) in 802.11.

In other embodiments, the AP 104, HEW device 102, and/or legacy device 106 may implement different technologies such as code-division multiple access (CDMA) 2000, CDMA2000 IX, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), Long Term Evolution (LTE), IEEE 802.15.1, 802.11ac, IEEE 802.16 (i.e., Worldwide Interoperability for Microwave Access (WiMAX)).

In an OFDMA system (e.g. 802.11ax), an associated HEW device 104 may operate on any 20 MHz sub-channel of the BSS 50 (that can operate, for example, at 80 MHz).

Embodiments pertain to wireless communications. Some embodiments relate to high-efficiency wireless communications including high-efficiency Wi-Fi/wireless local-area network (WEAN) and HEW communications. Some embodiments relate to wireless communications in accordance with one of the IEEE 802.11 standards including the High Efficiency WEAN Study Group (HEW SG) that is now IEEE 802.11ax Task Group.

In accordance with some IEEE 802.11ax (High-Efficiency Wi-Fi) embodiments, AP 104 may operate as a master station, which may be arranged to contend for a wireless medium (e.g., during a contention period) to receive exclusive control of the medium for a HEW control period (i.e., a transmission opportunity (TXOP)). The master station may transmit an HEW master-sync transmission at the beginning of the HEW control period. During the HEW control period, HEW stations may communicate with the master station in accordance with a non-contention based multiple access technique. This is unlike conventional Wi-Fi communications in which devices communicate in accordance with a contention-based communication technique, rather than a multiple access technique. During the HEW control period, the master station may communicate with HEW stations using one or more HEW frames. During the HEW control period, legacy stations refrain from communicating. In some embodiments, the master-sync transmission may be referred to as an HEW control and schedule transmission.

In some embodiments, the multiple-access technique used during the HEW control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station may also communicate with legacy stations in accordance with legacy IEEE 802.11 communication techniques. In some embodiments, the master station may also be configurable to communicate with HEW stations outside the HEW control period in accordance with legacy IEEE 802.11 communication techniques, although this is not a requirement.

Figure 2:
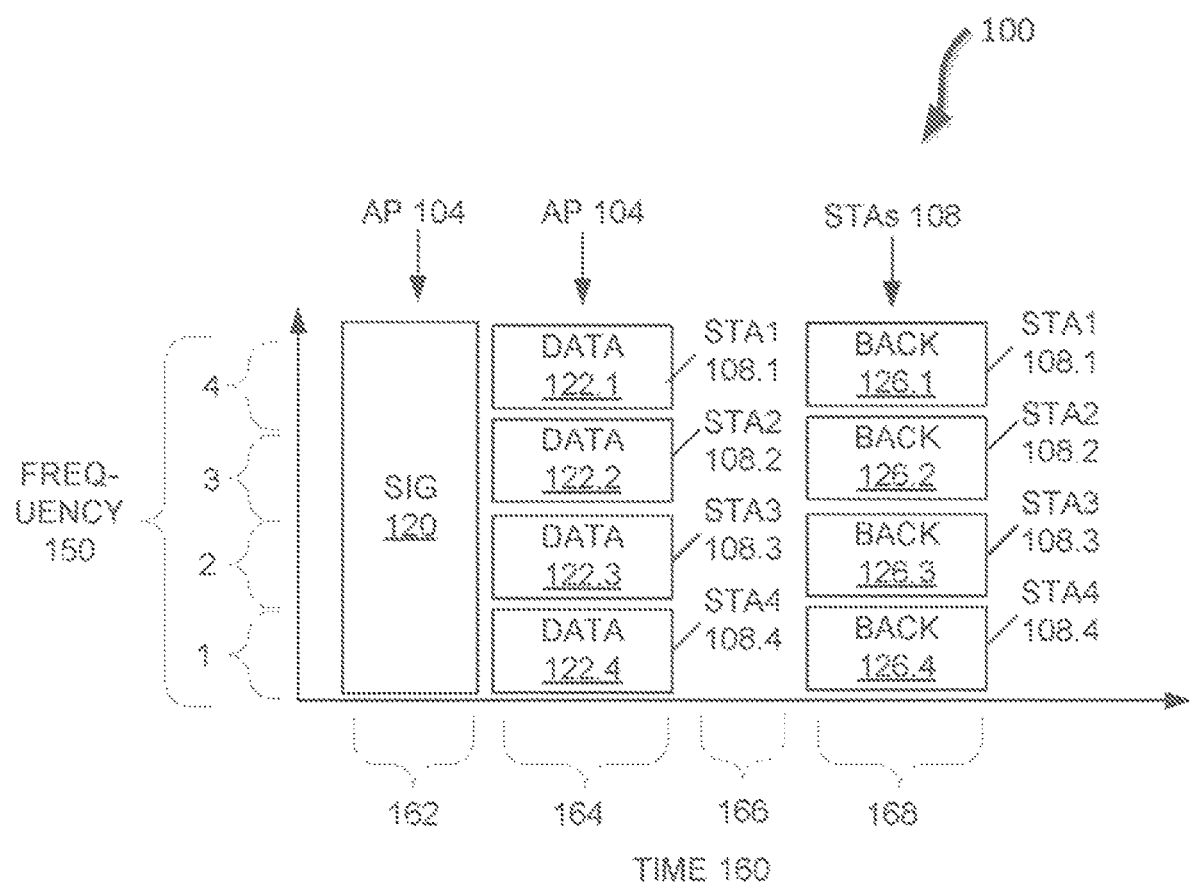
FIG. 2 illustrates a time sequence diagram of an acknowledgement, in accordance with some example embodiments.

FIG. 2 illustrates a time sequence diagram 100 of an acknowledgement, in accordance with some example embodiments. Illustrated in FIG. 1 is a time sequence diagram 100, AP 104, STAs 108, SIG 120, DATA 122, and BACK 126. In example embodiments, the STAs 108 are HEW devices 102. The time sequence diagram 100 illustrates time 160 along the horizontal axis and frequency 150 along the vertical axis. The transmitter is indicated along the top.

The frequency 150 may be divided into four subchannels 1, 2, 3, 4. In example embodiments, each subchannel 1, 2, 3, 4 may have a bandwidth of 5 MHz. In example embodiments, each subchannel has a bandwidth, and the bandwidths may be different. For example, subchannels 1 and 2 may have a bandwidth of 5 MHz, subchannel 3 may have a bandwidth of 10 MHz, and subchannel 4 may have a bandwidth of 20 MHz. In example embodiments, the subchannels 1, 2, 3, 4 may be in accordance with a wireless standard. As illustrated, there is one AP 104 and four STAs 108. In example embodiments, there may be more or fewer STAs 108 and more or fewer APs 104.

In example embodiments, the STAs 108 and AP 104 may be using OFDMA to communicate. In example embodiments, the STAs 108 and AP 104 may be using uplink and downlink multiple-user multiple-input multiple-out (UL MU-MIMO) to communicate. In MU-MIMO, two or more spatial streams may be used that utilize the same frequency. In example embodiments, the STAs 108 and AP 104 may communicate according to a wireless communication standard. In example embodiments, the wireless standard may be 802.11, 802.11a, 802.11b, 802.11g, 802.11n, 802.11ac, 802.11ad, 802.11af, 802.11ah, 802.11ai, 802.11aj, 802.11aq, 802.11ax, Bluetooth, or another wireless standard.

In example embodiments, the STAs 108 are mobile devices. In example embodiments, the STAs 108 are wireless mobile devices. In example embodiments, the AP 104 is an AP. In example embodiments, the AP 104 is a mobile device. In example embodiments, the AP 104 is a wireless device. In example embodiments, the AP 104 is a STA 108.

In example embodiments, the SIG 120 is a signal that may include information regarding the data 122. In example embodiments, the SIG 120 may include information regarding the AP 104. In example embodiments, the SIG 120 may include information regarding an acknowledgement policy. In example embodiments, the SIG 120 may comprise a frame that complies with a wireless standard. In example embodiments, the SIG 120 comprises a control or management frame that complies with a wireless standard.

In example embodiments, the data 122 may be a signal that comprises a data frame that complies with a wireless standard. In example embodiments, the BACK 126 may be a signal that comprises an acknowledgement frame in accordance with a wireless standard. In example embodiments, the BACK 126 may be a block acknowledgment in accordance with a wireless standard. In example embodiments, the data 122 includes an indication of an acknowledgement policy.

The time sequence diagram 100 begins at 162 with the AP 104 transmitting the SIG 120 to the STAs 108. In an example embodiment, the AP 104 may determine, based on the acknowledge policy being used, to include a bit in the SIG 120 that indicates to the STAs 108 to use an acknowledgement policy where the STAs 108 transmit an BACK 126 to the AP 104 without waiting for a request to transmit the BACK 126. In example embodiments, the AP 104 may transmit an indication to the STAs 108 of an acknowledgement policy in a previous frame.

The time sequence diagram 100 continues at 164 with the AP 104 transmitting data 122 to the STAs 108. For example, the AP 104 may transmit data 122.2 to STA2 108.2 on subchannel 3.

In an example embodiment, the AP 104 may determine not to transmit a schedule (SCH)/SIG after the data 122 based on the acknowledgement policy of the AP 104. In an example embodiment, the AP 104 may include an indication of an acknowledge policy in frames of the data 122.

The time sequence diagram 100 continues at 166 with the STAs 108 waiting to transmit ACKs 126. In some embodiments, the STAs 108 may wait a short interframe space (SIFS) 166 before transmitting the BACKs 126. In example embodiments, the STAs 108 may determine to not wait for a SCH and/or a SIG and/or an ACK request from the AP 104 based on an acknowledgement policy. In example embodiments, the STAs 108 may wait SIFs 166 before transmitting the ACKs 126 based on receiving an indication of an acknowledgement policy from the AP 104. In example embodiments, the STAs 108 may wait a period of time greater than the SIFS 166. In example embodiments, the AP 104 may transmit to the STAs 108 a pre-determined amount of time the STAs 108 should wait before transmitting. In example embodiments, an indication of the acknowledgement policy may have been sent to the STAs 108 in an earlier frame such as a beacon or other management frame, or in a control or data frame. For example, an indication of the acknowledgement policy may have been sent in the SIG 120 or DATA 122 frames.

The time sequence diagram 100 continues at 168 with the STAs 108 transmitting ACKs 126 to the AP 104. In example embodiments, the STAs 108 use the same subchannel on which they received the data 122 to transmit the ACK 126. For example, STA3 108.3 received data 122.3 on subchannel 2 and transmitted an ACK 126.3 to the AP 104 on subchannel 2. In example embodiments, the ACKs 126 are ACKs 126. In example embodiments, the STAs 108 are configured to send the BACKs 126 in response to the DATA 122 without receiving a SCH and/or a (SIG and/or an BACK request from the AP 104 based on an acknowledgement policy.

In example embodiments, the BACKs 126 are transmitted to the AP 104 in response to an implicit request from the AP 104 that is part of an acknowledgement policy. In example embodiments, the STAs 108 may transmit data (not illustrated) prior to or after transmitting the BACKs 126. In example embodiments, one of the SIG 120 or the DATA 122 includes a schedule, and the STAs transmit data according to the schedule. In example embodiments, the BACK 126 may be part of a data frame (not illustrated).

The STAs 108 transmitting BACKs 126 without receiving additional frames from the AP 104 may have the technical effect of saving time since transmitting a scheduling and/or SIG frame takes time. The scheduling and/or SIG frame may take 100 microseconds.

In some embodiments, the MU-MIMO may be used where one or more subchannels 1, 2, 3, 4 may be shared by more than one STA 108. For example, subchannel 4 may be shared by a MU-MIMO group such as STA1 108.1 and STA5 108.5 (not illustrated). In example embodiments, the acknowledgement policy may be based on a pre-determined rule. In example embodiments, the STA 108 may determine when to transmit a BACK 126 based on a spatial stream associated with the STA 108. In example embodiments, the STA 108 from the MU-MIMO group that the first spatial stream is intended for may be the first STA 108 to transmit the BACK 126 after the data 122 transmission is received.

Figure 3:
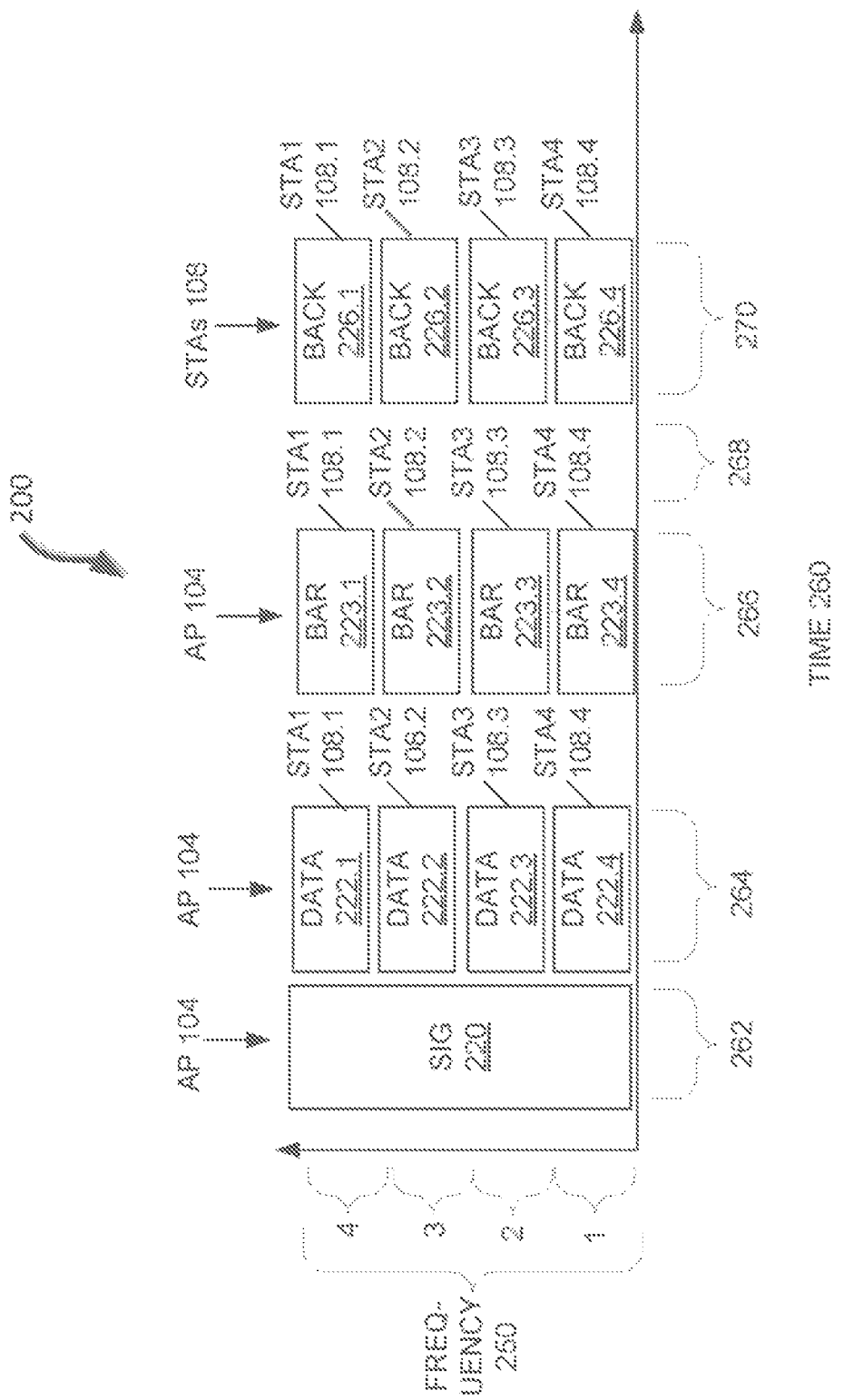
FIG. 3 illustrates a time sequence diagram of an acknowledgement, in accordance with some example embodiments.

FIG. 3 illustrates a time sequence diagram 200 of an acknowledgement, in accordance with some example embodiments. Illustrated in FIG. 3 is a time sequence diagram 200, AP 104, STAs 108, SIG 220, DATA 222, block acknowledgement request (BAR) 223, and BACK 226. The time sequence diagram illustrates time 260 along the horizontal axis and frequency 250 along the vertical axis. The transmitter is indicated along the top.

In example embodiments, the BAR 223 may be a signal that is a block acknowledgement request 223 according to a wireless standard. In example embodiments, the block acknowledgement (BACK) 226 may be a signal that is a block acknowledgement according to a wireless standard.

The time sequence diagram 200 begins at 262 with the AP 104 transmitting the SIG 220 to the STAs 108. The time sequence diagram 200 continues at 264 with the AP 104 transmitting data 222 to the STAs 108. For example, the AP 104 may transmit data 222.2 to STA2 108.2 on subchannel 3.

The time sequence diagram 200 continues at 266 with the AP 104 transmitting BAR 223 to the STAs 108. The BAR 223 may include an indication that the STAs 108 are to use an acknowledgement policy that indicates that the BACKs 226 are to be transmitted on the same subchannel 1, 2, 3, 4 in which the BAR 223 and/or DATA 222 was transmitted to the STAs 108. In example embodiments, the indication of the acknowledgement policy may have been sent to the STAs 108 in an earlier frame such as a beacon or other management frame, or in a control or data frame:

The time sequence diagram 200 may continue at 268 with the STAs 108 waiting to transmit BACKs 226. In example embodiments, the STAs 108 may wait a SIFS 268 before transmitting the BACKs 226. In example embodiments, the STAs 108 may determine to not wait for a SCH/SIG and wait SIFs 268 before transmitting the BACKs 226. In example embodiments, the STAs 108 may determine to not wait for a SCH/SIG and wait SIFs 268 before transmitting the BACKs 226 based on receiving an indication from the AP 104 that the SCH/SIG would not be sent. In example embodiments, the STAs 108 may wait a different period of time before transmitting the BACK 226.

The time sequence diagram 200 continues at 270 with the STAs 108 transmitting BACKs 226 to the AP 104. In some embodiments, the STAs 108 use the same subchannel on which they received the data 222 and/or BAR 223 to transmit the BACK 226. For example, STA3 108.3 received BAR 223.3 on subchannel 2 and transmitted a BACK 226.3 to the AP 104 on subchannel 2. In some embodiments, the STAs 108 are configured to send the BACKs 226 in response to the BAR 223 without receiving a SCH and/or a SIG based on receiving an indication to implement this acknowledgement policy from the AP 104.

In example embodiments, the MU-M IMO may be used where one or more subchannels 1, 2, 3, 4 may be shared by more than one STA 108. For example, subchannel 4 may be shared by a MU-MIMO group such as STA1 108.1 and SIA5 108.5 (not illustrated). In example embodiments, the acknowledgement policy may be based on a pre-determined rule. In example embodiments, the STA 108 may determine when to transmit a BACK 226 based on a spatial stream associated with the STA 108. In example embodiments, the STA 108 from the MU-MIMO group that the first spatial stream is intended for may be the first STA 108 to transmit the BACK 226 after the DATA 222 transmission is received.

Figure 4:
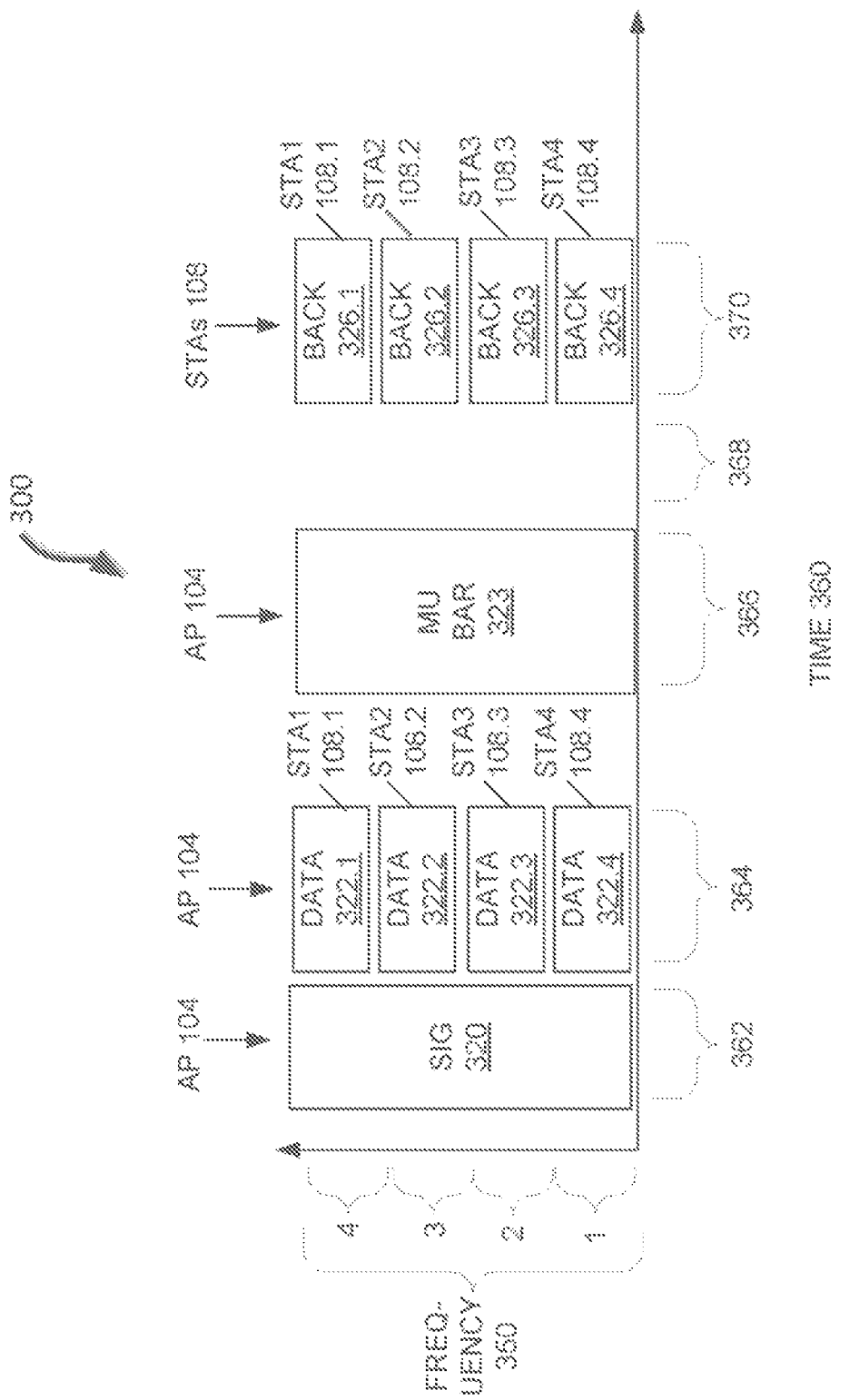
FIG. 4 illustrates a time sequence diagram of an acknowledgement, in accordance with some example embodiments.

FIG. 4 illustrates a time sequence diagram 300 of an acknowledgement, in accordance with some example embodiments. Illustrated in FIG. 4 is a time sequence diagram 300, AP 104, STAs 108, SIG 320, DATA 322, multi-user block acknowledgement request (MU BAR) 323, and BACK 326. The time sequence diagram illustrates time 360 along the horizontal axis and frequency 350 along the vertical axis. The transmitter is indicated along the top.

In example embodiments, the MU BAR 323 may be a signal that is a multi-user BACK request according to a wireless standard. In example embodiments, the MU BAR 323 is a BACK request transmitted on subchannels 1, 2, 3, 4 to the STAs 108. In an example embodiment, the MU-BAR 323 may be a multicast/broadcast frame addressing multiple STAs 108. In example embodiments, the MU BAR 323 may include an indication that the STAs 108 are to use an acknowledgement policy that indicates on which subchannel 1, 2, 3, 4 that the BACKs 326 are to be transmitted.

The time sequence diagram 300 begins at 362 with the AP 104 transmitting the SIG 320 to the STAs 108. The time sequence diagram 300 continues at 364 with the AP 104 transmitting data 322 to the STAs 108. For example, the AP 104 may transmit data 322.2 to STA2 108.2 on subchannel 3.

The time sequence diagram 300 continues at 366 with the AP 104 transmitting MU-BAR 323 to the STAs 108. In example embodiments, the MU BAR 323 may be transmitted on a band of the subchannels 1, 2, 3, 4 that polls two or more of the STAs 108 to transmit BACKs 326.

In example embodiments, the MU BAR 323 may include an indication that the STAs 108 are to use an acknowledgement policy that indicates that the BACKs 326 are to be transmitted on the same subchannel 1, 2, 3, 4 in which the DATA 622 was transmitted to the STAs 108. In example embodiments, the indication of the acknowledgement policy may have been sent to the STAs 108 in an earlier frame such as a management or control frame. In an example embodiment, MU-BAR 323 may include subchannel allocation for the uplink BACKs 326. In example embodiments, the MU-BAR 323 includes one or more of the following information: association identification (AID) of the STAs 108, subchannel for the STA 108 to use to transmit the BACK 326, and legacy BAR information that may be included in one or more wireless standards.

The time sequence diagram 300 continues at 368 with the STAs 108 waiting to transmit BACKs 326. In some embodiments, the STAs 108 may wait a SIFS 368 before transmitting the ACKs 326. In example embodiments, the STAs 108 may determine to not wait for a SCH/SIG and wait STAs 366 before transmitting the ACKs 326 based on receiving an indication of an acknowledgement policy in the SIG 320.

The time sequence diagram 300 continues at 370 with the STAs 108 transmitting BACKs 326 to the AP 104. In example embodiments, the STAs 108 use the same subchannel on which they received the data 322 to transmit the BACK 326. For example, STA3 108.3 received data 322.3 on subchannel 2 and transmitted a BACK 326.3 to the AP 104 on subchannel 2. In example embodiments, the STAs 108 are configured to send the BACKs 326 in response to the MU BAR 323 without receiving a SCH and/or a SIG based on receiving an indication to implement this acknowledgement policy from the AP 104. In example embodiments, the STAs 108 are configured to transmit the BACKs 326 on an allocated subchannel 1, 2, 3, 4 based on a subchannel allocation in the MU-BAR 323.

In some embodiments, the MU-MIMO may be used where one or more subchannels 1, 2, 3, 4 may be shared by more than one STA 108. For example, subchannel 4 may be shared by a MU-MIMO group such as STA1 108.1 and STA5 108.5 (not illustrated). In example embodiments, the acknowledgement policy may be based on a pre-determined rule. In example embodiments, the STA 108 may determine when to transmit a BACK 326 based on a spatial stream associated with the STA 108. In example embodiments, the STA 108 from the MU-MIMO group for which the first spatial stream is intended may be the first STA 108 to transmit the BACK 326 after the DATA 322 transmission is received.

Figure 5:
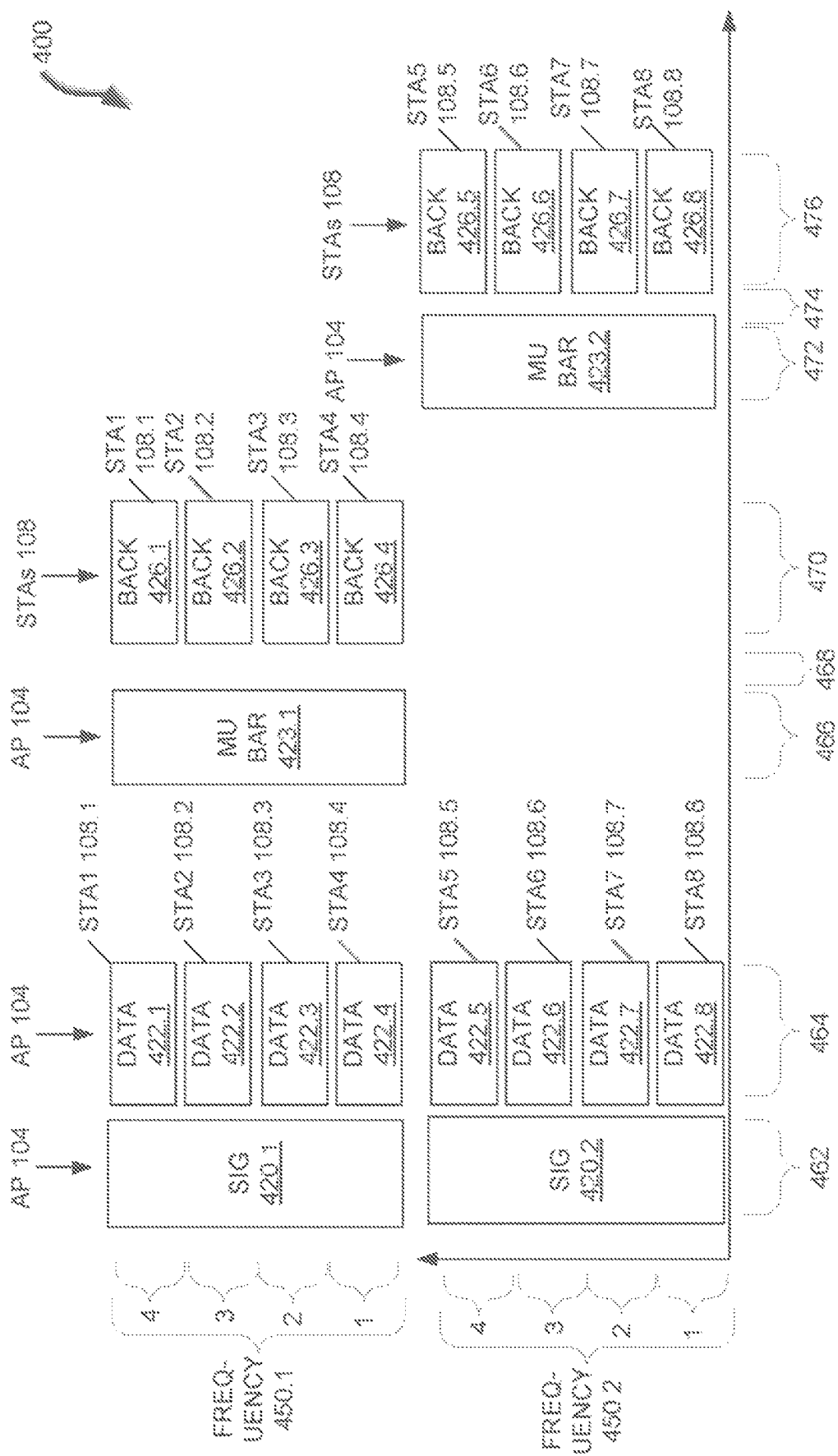
FIG. 5 illustrates a time sequence diagram of an acknowledgement, in accordance with some example embodiments.

FIG. 5 illustrates a time sequence diagram 400 of an acknowledgement, in accordance with some example embodiments. Illustrated in FIG. 5 is a time sequence diagram 400, AP 104, STAs 108, SIG 420, DATA 422, MU BAR 423.1, MU BAR 423.2, and BACK 426. The time sequence diagram illustrates time 460 along the horizontal axis and frequency 450 along the vertical axis. The transmitter is indicated along the top. As illustrated, the AP 104 and two or more of the STAs 108 may be using MU-MIMO and OFDMA. As illustrated, the frequency 450 is illustrated twice (450.1 and 450.2), with 450.1 illustrating a first MU-MIMO group and 450.2 illustrating a second MU-MIMO group.

The time sequence diagram 400 begins at 462 with the AP 104 transmitting the SIG 420.1 and SIG 420.2 to the STAs 108. The time sequence diagram 400 continues at 464 with the AP 104 transmitting data 422 to the STAs 108. For example, the AP 104 may transmit data 422.2 to STA2 108.2 in a first spatial stream and STA6 108.6 on subchannel 3 in a second spatial stream.

The time sequence diagram 400 continues at 466 with the AP 104 MU-BAR 423.1 to the STAs 108. In an example embodiment, the MU BAR 423.1 may be transmitted on a band that polls two or more of the STAs 108 to transmit BACKs 426. For example, MU BAR 423.1 may poll STA1 108.1 through STA4 108.4 on subchannels 1, 2, 3, 4 in MU-MIMO group. The MU BAR 423 may include an indication that the STAs 108 are to use an acknowledgement policy that indicates that the BACKs 426 are to be transmitted on the same subchannel 1, 2, 3, 4 in which the DATA 422 was transmitted to the STAs 108.

In example embodiments, the MU-BAR 423 may indicate which MU-MIMO group should respond. In example embodiments, the MU-BAR 423 may indicate that a MU-MIMO group should respond, and the STAs 108 may determine which group should respond based on a predetermined rule. In example embodiments, the indication of the acknowledgement policy may have been sent to the STAs 108 in an earlier frame such as a management or control frame. In example embodiments, the MU-BAR 423 may be a multicast/broadcast frame addressing multiple STAs 108. In example embodiments, MU-BAR 423 may include subchannel allocation for the uplink BACKs 426. The MU-BAR 423 may include one or more of the following information AID of the STAs 108: subchannel for the STA 108 to use to transmit the BACK 426 and legacy BAR information that may be included in one or more wireless standards.

The time sequence diagram 400 continues at 468 with the STAs 108 waiting to transmit BACKs 426. In example embodiments, the STAs 108 may wait a short SIFS 468 before transmitting the BACKs 426. En example embodiments, the STAs 108 may determine to not wait for a SCH/SIG and wait SIFs 466 before transmitting the BACKs 426. In example embodiments, the STAs 108 may determine to not wait for a SCH/SIG and wait SIFs 466 before transmitting the BACKs 426 based on receiving an indication of an acknowledgement policy in the SIG 420.

The time sequence diagram 400 continues at 470 with the STAs 108 transmitting BACKs 426 to the AP 104. In an example embodiment, the STAs 108 use the same subchannel on which they received the data 422 to transmit the BACK 426. For example, STA3 108.3 received data 423.3 on subchannel 2 and transmitted a BACK 426.3 to the AP 104 on subchannel 2. In an example embodiment, the STAs 108 are configured to send the BACKs 426 in response to the MU-BAR 423 without receiving a SCH and/or a SIG based on receiving an indication to implement this acknowledgement policy from the AP 104. In an example embodiment, the STAs 108 are configured to transmit the BACKs 426 on subchannels 1, 2, 3, 4 based on a subchannel allocation in the MU-BAR 423.

The time sequence diagram 400 continues at 472 with the AP 104 transmitting a second MU-BAR 423.2. In an example embodiment, the AP 104 transmits at least one MU-BAR 423 for each MU-MIMO group.

The time sequence diagram 400 continues at 474 with the STAs 108 waiting to transmit BACKs 726. The time sequence diagram 400 continues at 476 with the STAs 108 transmitting BACKs 426 to the AP 104. In an example embodiment, the STAs 108 use the same subchannel on which they received the data 422 to transmit the BACK 426. For example, STA3 108.3 received data 422.3 on subchannel 2 and transmitted a BACK 426.3 to the AP 104 on subchannel 2. In an example embodiment, the STAs 108 are configured to send the BACKs 426 in response to the MU-BAR 423 without receiving a SCH and/or a SIG based on receiving an indication to implement this acknowledgement policy from the AP 104. In an example embodiment, the STAs 108 are configured to transmit the BACKs 426 on subchannels 1, 2, 3, 4 based on a subchannel allocation in the MU-BAR 423.

As illustrated, STA1 108.1 and STA5 108.5 are in different MU-MIMO groups. STA1 108.1 transmitted a BACK 426.1 to the AP 104 at 470 in response to MU-BAR 423.1 at 466. STAS 108.5 transmitted a BACK 426.5 to the AP 104 at 476 in response to the MU-BAR 423.2 at 472.

Figure 6:
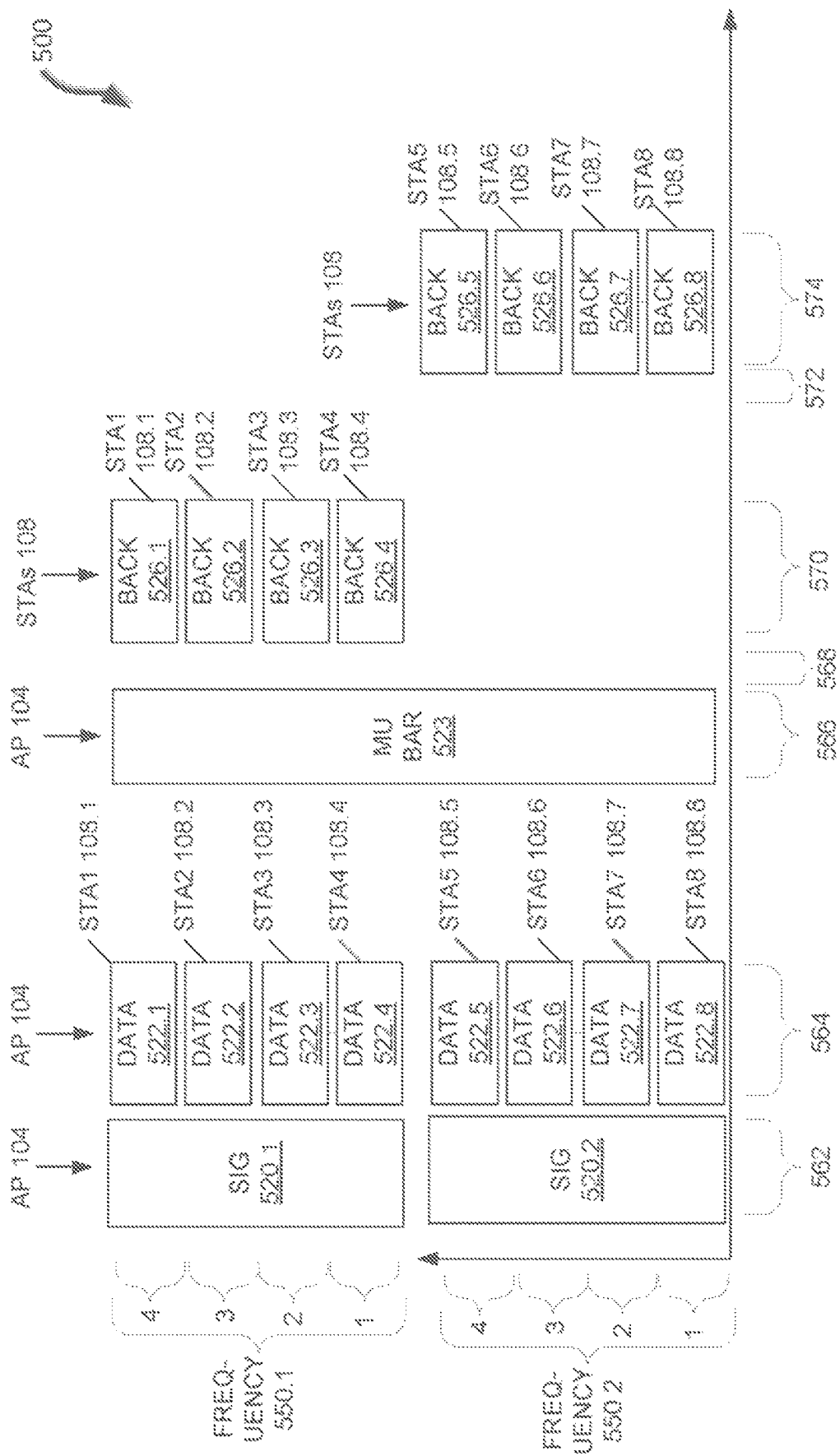
FIG. 6 illustrates a time sequence diagram of an acknowledgement, in accordance with some example embodiments.

FIG. 6 illustrates a time sequence diagram 500 of an acknowledgement, in accordance with some example embodiments. Illustrated in FIG. 6 is a time sequence diagram 500, AP 104, STAs 108, SIG 520, DATA 522, MU BAR 523, and BACK 526. The time sequence diagram illustrates time 560 along the horizontal axis and frequency 550 along the vertical axis. The transmitter is indicated along the top. As illustrated, the AP 104 and two or more of the STAs 108 may be using MU-MIMO and OFDMA. As illustrated, the frequency 550 is illustrated twice (550.1 and 550.2), with 550.1 illustrating a first MU-MIMO group and 550.2 illustrating a second MU-MIMO group.

The time sequence diagram 500 begins at 562 with the AP 104 transmitting the SIG 520 to the STAs 108. In example embodiments, the AP 104 transmits separate SIGS 520 for the two illustrated MU-MIMO groups.

The time sequence diagram 500 continues at 564 with the AP 104 transmitting data 522 to the STAs 108. For example, the AP 104 may transmit data 522.2 to STA2 108.2 and data 522.6 to STA6 108.6 on subchannel 3. The data 522.2 and data 522.6 may be transmitted on different MU-MIMU groups.

The time sequence diagram 500 continues at 566 with the AP 104 transmitting multi-user block acknowledgement requests (MU-BAR) 523 to the STAs 108. In example embodiments, the MU BAR 523 may be transmitted on a band that polls two or more of the STAs 108 to transmit BACKs 526. In example embodiments, the MU BAR 523 may poll multiple MU-MIMO groups.

In example embodiments, the MU BAR 523 may include an indication that the STAs 108 are to use an acknowledgement policy that indicates that the BACKs 526 are to be transmitted on the same subchannels 1, 2, 3, 4 in which the DATA 522 was received by the STAs 108.

In example embodiments, the MU-BAR 523 may indicate which MU-MIMO group should respond. In an example embodiment, the MU-BAR 523 may indicate that a particular MU-MIMO group should respond. In example embodiments, the STAs 108 may determine which group should respond based on a predetermined rule. In example embodiments, the indication of the acknowledgement policy may have been sent to the STAs 108 in an earlier frame such as a management, data, or control frame.

In example embodiments, the MU-BAR 523 is a multicast/broadcast frame addressing multiple STAs 108. In example embodiments, MU-BAR 523 may include subchannel allocation for the uplink BACKs 526. In example embodiments, the MU-BAR 523 includes one or more of the following information AID of the STAs 108: subchannel for the STA 108 to use to transmit the BACK 526, order of the STAs 108 to transmit BACKs 826 in the MU group that are following the MU-BAR 823, and legacy BAR information that may be included in one or more wireless standards. In example embodiments, the MU-BAR 523 is send once for each MU-MIMO group.

The time sequence diagram 500 may continue at 568 with the STAs 108 waiting to transmit BACKs 526. In some embodiments, the STAs 108 may wait a SIFS 568 before transmitting the BACKs 526. In example embodiments, the STAs 108 may determine to not wait for a SCH/SIG and wait SIFs 568 before transmitting the BACKs 526 based on receiving an indication from the AP 104 that the SCH/SIG would not be sent. In example embodiments, the STAs 108 may wait another length of time.

The time sequence diagram 500 continues at 570 with the STAs 108 transmitting BACKs 526 to the AP 104. In an example embodiment, the STAs 108 use the same subchannel on which they received the data 522 to transmit the BACK 526. For example, STA3 108.3 received BAR 523.3 on subchannel 2 and transmitted a BACK 526.3 to the AP 104 on subchannel 2. In an example embodiment, the STAs 108 are configured to send the BACKs 526 in response to the MU-BAR 523 without receiving a SCH and/or a SIG based on receiving an indication to implement this acknowledgement policy from the AP 104. In an example embodiment, the STAs 108 are configured to transmit the BACKs 526 on subchannels 1, 2, 3, 4 based on a subchannel allocation in the MU-BAR 523.

The time sequence diagram 500 may continue at 572 with the STAs 108 waiting to transmit BACKs 526. In some embodiments, the STAs 108 may wait a SIFS 572 before transmitting the BACKs 526. In an example embodiments, the STAs 108 may determine to not wait for a SCH/SIG and wait SIFs 572 before transmitting the BACKs 526 based on receiving an indication from the AP 104 that the SCH/SIG would not be sent. In example embodiments, the STAs 108 may wait another length of time.

The time sequence diagram 500 continues at 574 with the STAs 108 transmitting BACKs 526 to the AP 104. In an example embodiment, the STAs 108 use the same subchannel on which they received the data 522 to transmit the BACK 526. For example, STA3 108.3 received BAR 523.3 on subchannel 2 and transmitted a BACK 526.3 to the AP 104 on subchannel 2. In an example embodiment, the STAs 108 are configured to send the BACKs 526 in response to the MU-BAR 523 without receiving a SCFI and/or a SIG based on receiving an indication to implement this acknowledgement policy from the AP 104. In an example embodiment, the STAs 108 are configured to transmit the BACKs 526 on subchannel 1, 2, 3, 4 based on a subchannel allocation in the MU-BAR 523.

As illustrated, STA1 108.1 and STA5 108.5 are in different MU-MIMO groups. STA1 108.1 transmitted a BACK 526.1 to the AP 104 at 570 in response to MU-BAR 523 at

566. STA5 108.5 transmitted a BACK 526.5 to the AP 104 at 574 in response to the MU-BAR 523 at 566.

In example embodiments, the technical effect is achieved of reducing the time to receive BACKs by requesting that BACK be sent in parallel. In example embodiments, the technical effect is achieved of reducing the time to receive BACK by not including a schedule subchannel allocation in a BAR.

Figure 7:
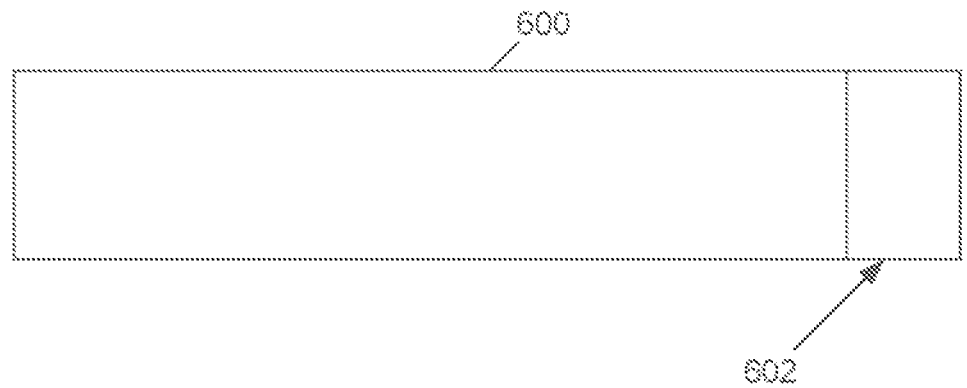
FIG. 7 illustrates a frame with a field for acknowledgement, in wireless networks according to example embodiments.

FIG. 7 illustrates a frame 600 with a field 602 for acknowledgement in wireless networks, according to example embodiments. In example embodiments, the frame 600 is a signal that is a management, control, or data frame. In example embodiments, the frame 600 is a SIG frame, beacon frame, data frame, or MU BAR frame. In example embodiments, the field 602 may indicate an acknowledgement policy indicating how a STA 108 should acknowledge frames.

In example embodiments, the STA 108 is communicating in accordance with OFDMA and MU-MIMO. In example embodiments, the field 602 may indicate that the STA 108 should use a same subchannel or channel to acknowledge a frame as the frame was received on. In example embodiments, the STA 108 may be configured to use block acknowledgements. In example embodiments, the field 602 may be a single bit indicating that an OFDMA MU-MIMO acknowledgment policy should be used. The acknowledgment policy may be a block acknowledgment policy.

In example embodiments, the frame 600 is a frame transmitted prior to data frames, and the frame 600 includes an indication that data frames should be acknowledged using block acknowledgment on subchannels that were used to transmit the data frames.

In example embodiments, the field 602 may indicate an acknowledgement policy for groups in MU-MIMO. In example embodiments, the field 602 indicates that a STA should block acknowledge based on the order of the MU-MIMO group. In example embodiments, the field 602 indicates that the STA should acknowledge frames in the order of their MU-MIMO group. In example embodiments, the field 602 indicates that the STA should acknowledge frames according to their MU-MIMO group and wait a SIFS before transmitting the block acknowledgement.

In example embodiment, the field 602 may indicate that the STA should wait a SIFS after receiving a block acknowledgement request to transmit a block acknowledgment.

In example embodiments, the field 602 indicates that the STA should use a predetermined rule for a subchannel to transmit a block acknowledgment on and/or a predetermined rule for an order of a MU-MIMO group to transmit a block acknowledgement.

In example embodiments, the frame 600 is a SIG frame and the field 602 indicates that the STAs should acknowledge data frames transmitted after the SIG frame without waiting for an acknowledgement request.

Figure 8:
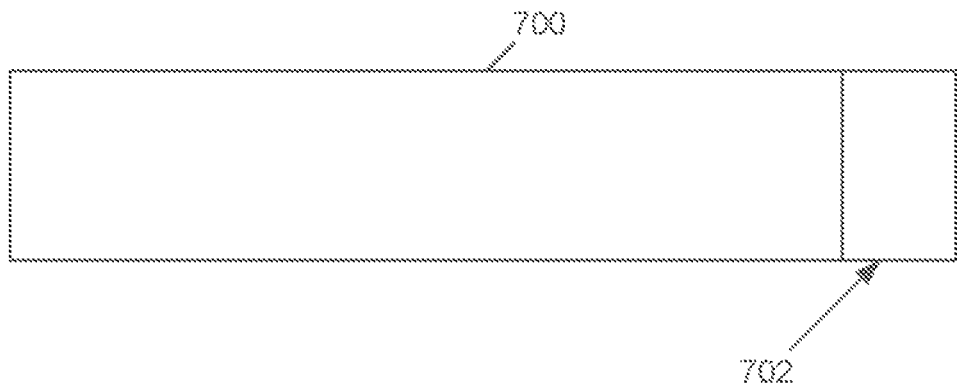
FIG. 8 illustrates a frame with a field for acknowledgement, in wireless networks according to example embodiments.

FIG. 8 illustrates a frame 700 with a field 702 for acknowledgement in wireless networks, according to example embodiments. In example embodiments, the frame 700 is a MU BAR signal and the field 702 indicates a subchannel allocation for a STA to use to transmit block acknowledgement of frames transmitted to the STA. In example embodiments, the frame 700 may be used for communications in OFDMA and MU-MIMO. In example embodiments, the frame 700 is a signal that is a block acknowledgement request for OFDMA and MU-MIMO. In example embodiments, the frame 700 is transmitted to poll multiple STAs at once to transmit multiple BACK in parallel back.

Figure 9:
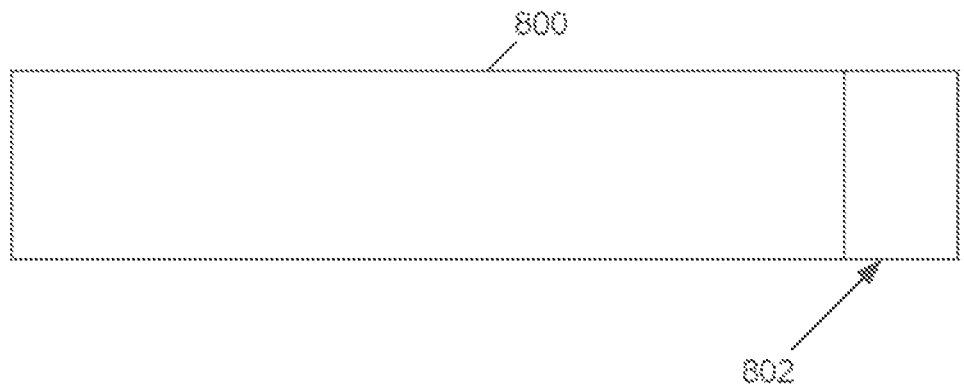
FIG. 9 illustrates a frame with a field for acknowledgement, in wireless networks according to example embodiments.

FIG. 9 illustrates a frame 800 with a field 802 for acknowledgement in wireless networks, according to example embodiments. The frame 800 may be a signal that is part of a management frame transmitted by the STA where the field 802 indicates one or more acknowledgement policies that are supported by the STA as disclosed herein.

Figure 10:
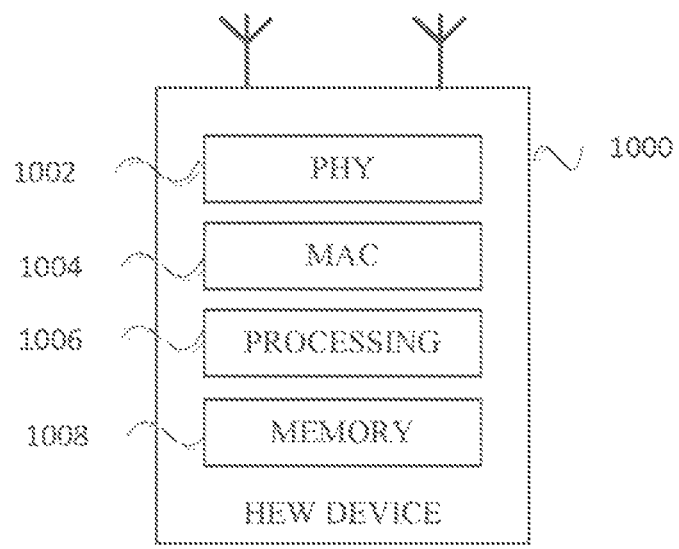
FIG. 10 illustrates a high-efficiency wireless HEW device, in accordance with some embodiments.

FIG. 10 illustrates a HEW device, in accordance with some embodiments. HEW device 1000 may be an HEW compliant device that may be arranged to communicate with one or more other HEW devices, such as HEW devices 104 (FIG. 1) or AP 104 (FIG. 1) as well as communicate with legacy devices 106 (FIG. 1). HEW devices 104 and legacy devices 106 may also be referred to as HEW STAs and legacy STAs, respectively. HEW device 1000 may be suitable for operating as AP 104 (FIG. 1) or an HEW device 104 (FIG. 1). In accordance with embodiments, HEW device 1000 may include, among other things, physical layer (PHY) circuitry 1002 and medium-access control layer circuitry (MAC) 1004. PHY circuitry 1002 and MAC 1004 may be HEW compliant layers and may also be compliant with one or more legacy IEEE 802.11 standards. MAC 1004 may be arranged to configure physical layer convergence procedure protocol data unit PPDUs and arranged to transmit and receive PPDUs, among other things. HEW device 1000 may also include other hardware processing circuitry 1006 and memory 1008 configured to perform the various operations described herein.

In some embodiments, the MAC 1004 may be arranged to contend for a wireless medium during a contention period to receive control of the medium for the HEW control period and configure an HEW PPDU. The PHY circuitry 1002 may be arranged to transmit the HEW PPDU. The PHY circuitry 1002 may include circuitry for modulation/demodulation, upconversion/downconversion, filtering, amplification, and the like. In some embodiments, the hardware processing circuitry 1006 may include one or more processors. The hardware processing circuitry 1006 may be configured to perform functions based on instructions being stored in a random access memory (RAM) or read-only memory (ROM), or based on special purpose circuitry. In some embodiments, two or more antennas may be coupled to the PHY circuitry 1002 and arranged for sending and receiving signals including transmission of the HEW packets. The HEW device 1000 may include a transceiver (not shown) to transmit and receive data such as HEW PPDU. The memory 1008 may store information for configuring the other circuitry to perform operations for configuring and transmitting HEW packets and performing the various operations described herein including the reception of and transmission of SIGs 120, 220, 320, 420, and 520; DATA 122, 222, 322, 422, and 522; MU BAR 323, 423, and 523; BAR 223; BACK 226, 326, 426, and 526; frames 600 and 700; and, ACK 126. In example embodiments, the circuitry of one or more of the antenna, transceiver, PHY circuitry 1002, MAC 1.004, and processing 1006 may be configured to perform operations for configuring and transmitting HEW packets and performing the various operations described herein including the reception of and transmission of SIGs 120, 220, 320, 420, and 520; DATA 122, 222, 322, 422, and 522; MU BAR 323, 423, and 523; BAR 223; BACK 226, 326, 426, and 526; frames 600 and 700; and, ACK 126.

In some embodiments, the HEW device 1000 may be configured to communicate using OFDM communication signals over a multicarrier communication channel. In some embodiments, HEW device 1000 may be configured to communicate in accordance with one or more specific communication standards, such as the IEEE standards including IEEE 802.11-2012, 802.11n-2009, 802.11ac-2013, 802.11ax, standards and/or proposed specifications for WLANs, although the scope of the example embodiments is not limited in this respect as they may also be suitable to transmit and/or receive communications in accordance with other techniques and standards.

In some embodiments, an HEW device 1000 may be part of a portable wireless communication device, such as a PDA) a laptop or portable computer with wireless communication capability, a web tablet, a wireless telephone, a smartphone, a wireless headset, a pager, an instant messaging device, a digital camera, an AP, a television, a medical device (e.g., a heart rate monitor, a blood pressure monitor, etc.), a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The antennas may comprise one or more directional or omnidirectional antennas, including, for example, dipole antennas, monopole antennas, patch antennas, loop antennas, microstrip antennas or other types of antennas suitable for transmission of RF signals. In some MIMO embodiments, the antennas may be effectively separated to take advantage of spatial diversity and the different channel characteristics that may result.

Although the device 1000 is illustrated as having several separate functional elements, one or more of the functional elements may be combined and may be implemented by combinations of software-configured elements, such as processing elements including DSPs, and/or other hardware elements. For example, some elements may comprise one or more microprocessors, DSPs, FPGAs, ASICs, transmitters, receivers, transceivers, RFICs, and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include ROM, RAM, magnetic disk storage media, optical storage media, flash-memory devices, and other storage devices and media. Some embodiments may include one or more processors and may be configured with instructions stored on a computer-readable storage device.

The following examples pertain to further embodiments. Example 1 is a station (STA) including hardware processing circuitry configured to: receive data frames on a subchannel from an access point (AP) in accordance with down link (DL) multi-user multiple input and multiple output (MU-MIMO) and orthogonal frequency division multiple access (OFDMA). The hardware circuitry may be configured to: transmit a block acknowledgement of the data frames in accordance with uplink (UL) MU-MIMO and OFDMA, in response to the data frames.

In Example 2, the subject matter of Example 1 can optionally include: where the hardware processing circuitry is further configured to: transmit the block acknowledgement of the data frames on the subchannel.

In Example 3, the subject matter of Examples 1 and 2 can optionally include: where the hardware processing circuitry is further configured to: transmit the block acknowledgement of the data frames when a block acknowledgement request has not been received by the STA.

In Example 4, the subject matter of Examples 1 through 3 can optionally include: where the hardware processing circuitry is further configured to: receive an indication of an acknowledgment policy from the AP.

In Example 5, the subject matter of Examples 1 through 4 can optionally include: where the hardware processing circuitry is further configured to wait a short interframe space (SIFS) time before the transmit.

In Example 6, the subject matter of Examples 1 through 5 can optionally include: where the hardware processing circuitry is further configured to wait a predetermined time before the transmit, where the predetermined time is longer than a short interframe space (SIFS) time.

In Example 7, the subject matter of Examples 1 through 6 can optionally include: where the hardware processing circuitry is further configured to transmit the block acknowledgement at a time based on a MU-MIMO group identification of the wireless device.

In Example 8, the subject matter of Examples 1 through 7 can optionally include: where the hardware processing circuitry is further configured to: transmit second data frames in accordance with UL MU-MIMO and OFDMA, wherein the second data frames comprises the block acknowledgement of the data frames, in response to the data frames.

In Example 9, the subject matter of Examples 1 through 8 can optionally include: where the hardware processing circuitry is further configured to: transmit second data frames on the subchannel, and transmit the block acknowledgement of the data frames on the subchannel in accordance with UL MU-MIMO and OFDMA, in response to the data frames.

In Example 10, the subject matter of Examples 1 through 9 can optionally include: where the hardware processing circuitry is further configured to: receive a signal frame from the AP prior to the data frames.

In Example 11, the subject matter of Examples 1 through 10 can optionally include: where the data frames or the signal frame comprise an indication of a schedule; and where the second data frames are transmitted according to the schedule.

In Example 12, the subject matter of Examples 1 through 11 can optionally include: where the data frames or the signal frame comprise an indication to transmit the block acknowledgement of the data on the subchannel.

In Example 13, the subject matter of Examples 1 through 8 can optionally include: memory and a transceiver coupled to the processing circuitry.

In Example 14, the subject matter of Example 13 can optionally include: one or more antennas coupled to the transceiver.

Example 15 is a method on a station (STA). The method including receiving data frames on a subchannel from an access point (AP) using multi-user multiple-input multiple-output (MU MIMO). The method may further include transmitting a block acknowledgement of the data frames, wherein the block acknowledgement is transmitted without receiving a block acknowledgement request, in response to receiving the data frames.

In Example 16, the subject matter of Example 15 can optionally include: transmitting the block acknowledgement of the data frames on the subchannel.

In Example 17, the subject matter of Examples 15 and 16 can optionally include: waiting a short interframe space (SIFS) time before transmitting.

In Example 18 is an access point (AP). The AP may include hardware processing circuitry configured to: transmit first data frames to a first station (STA) on a first subchannel and concurrently transmit second data frames to a second STA on a second subchannel in accordance with down link (DL) multi-user multiple input and multiple output (MU-MIMO) and orthogonal frequency division multiple access (OFDMA). The hardware processing circuitry may be further configured to receive a first block acknowledgement from the first STA and concurrently receive a second block acknowledgement from the second STA in accordance with uplink (UL) MU-MIMO and OFDMA, where the first block acknowledgement is received on one of the first and second subchannels, and the second block acknowledgement is received on the other of the first and second subchannels.

In Example 19, the subject matter of Example 18 can optionally include: where the first subchannel and the second subchannel have a first bandwidth and a second bandwidth, respectively; and where the first bandwidth and the second bandwidth are each one of the following group: 1 MHz, 1.25 MHz, 2.5 MHz, 5 MHz, 10 MHz, 20 MHz, 40 Mhz, 80 MHz, and 160 MHz; and where the first subchannel and the second subchannel are different portions of a radio spectrum.

In Example 20, the subject matter of Examples 18 and 19 can optionally include where the hardware processing circuitry is further configured to: transmit the first transmission to the first STA on the first subchannel and a third transmission to a third STA on the first subchannel.

In Example 21, the subject matter of Examples 18 through 20 may option include where the hardware processing circuitry is further configured to: transmit a multi-user (MU) block acknowledgement request (BAR).

In Example 22, the subject matter of Example 21 may optionally include where the MU-BAR comprises a scheduling subchannel allocation.

In Example 23, the subject matter of Example 21 may optionally include where the hardware processing circuitry is further configured to: receive a third block acknowledgement from the third STA after the first block acknowledgement from the first STA is received, wherein the third subchannel and the first subchannel occupy the same portion of the radio spectrum.

Example 24 is a non-transitory computer-readable storage medium that stores instructions for execution by one or more processors to perform operations for block acknowledgement. The instructions configure the one or more processors to: receive data frames on a subchannel from an access point (AP) in accordance with down link (DL) multi-user multiple input and multiple output (MU-MIMO) and orthogonal frequency division multiple access (OFDMA); and transmit a block acknowledgement of the data frames on a subchannel in accordance with uplink (UL) MU-MIMO and OFDMA, in response to the data frames. In Example 25, the subject matter of Example 24 may optionally include where the instructions further configure the one or more processors to: transmit the block acknowledgement when a block acknowledgement request has not been received.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method performed by a first station, the method comprising:
    receiving a signal field from an access point, the signal field including a first schedule;
    receiving a first downlink data frame from the access point on a first sub-channel according to the first schedule, wherein a second downlink data frame from the access point is received by a second station on a second sub-channel simultaneously according to downlink multi-user multiple input multiple output (DL MU-MIMO) and/or orthogonal frequency division multiple access (OFDMA), wherein the first station is included in a first group and the second station is included in a second group;
    receiving a multi-user block acknowledgement request (MU BAR) from the access point, wherein the MU BAR polls a first response of one or more stations in the first group and a second response of one or more stations in the second group with different response timing, and wherein the MU BAR indicates a resource allocation for a first uplink block acknowledgement for the first downlink data frame to be transmitted by the first station, and
    transmitting, to the access point, the first uplink block acknowledgement for the first downlink data frame at a first response timing in response to the MU BAR based on the resource allocation, while a second uplink block acknowledgement for the second downlink data frame being transmitted to the access point from the second station at a second response timing after a short inter-frame space (SIFS) interval following the first response timing, in response to the MU BAR.

2. The method of claim 1, wherein the MU BAR is a group based request for the first group and the second group.

3. The method of claim 1 further comprising:
    waiting for the SIFS interval before transmitting the first uplink block acknowledgement for the first downlink data frame.

4. The method of claim 1 further comprising:
    waiting for a predetermined time before transmitting the first uplink block acknowledgement for the first downlink data frame, wherein the predetermined time is longer than the SIFS interval.

5. The method of claim 1, wherein the first uplink block acknowledgement is transmitted by being included in a first uplink data frame.

6. The method of claim 1, wherein a bandwidth for each of the first sub-channel and the second sub-channel is one of the following bandwidths: 1 MHz, 1.25 MHZ, 2.5 MHz, 5 MHz, 10 MHz, 20 MHz, 40 MHz, 80 MHz, and 160 MHz.

7. A method performed by an access point, the method comprising:
    transmitting a signal field to a first station and a second station, the signal field including a first schedule and a second schedule;
    transmitting a first downlink data frame to the first station on a first sub-channel according to the first schedule and simultaneously transmitting a second downlink data frame to the second station on a second sub-channel according to the second schedule, the first downlink data frame and the second downlink data frame are transmitted based on downlink multi-user multiple input multiple output (DL MU-MIMO) and/or orthogonal frequency division multiple access (OFDMA), wherein the first station is included in a first group and the second station is included in a second group;

transmitting a multi-user block acknowledgement request (MU BAR) to the first station and the second station, wherein the MU BAR polls a first response of one or more stations in the first group and a second response of one or more stations in the second group with different response timing, and wherein the MU BAR indicates a resource allocation for a first uplink block acknowledgement for the first downlink data frame to be transmitted from the first station, and receiving the first uplink block acknowledgement for the first downlink data frame at a first response timing in response to the MU BAR and receiving a second uplink block acknowledgement for the second downlink data frame at a second response timing after a short interframe space (SIFS) interval following the first response timing, in response to the MU BAR.

8. The method of claim 7, wherein the MU BAR is a group based request for the first group and the second group.

9. The method of claim 7 further comprising:
waiting for the SIFS interval before receiving the first uplink block acknowledgement for the first downlink data frame.

10. The method of claim 7 further comprising:
waiting for a predetermined time before receiving the first uplink block acknowledgement for the first downlink data frame, wherein the predetermined time is longer than the SIFS interval.

11. The method of claim 7, wherein the first uplink block acknowledgement is received by being included in a first uplink data frame.

12. The method of claim 7, wherein a bandwidth for each of the first sub-channel and the second sub-channel is one of the following bandwidths: 1 MHz, 1.25 MHZ, 2.5 MHz, 5 MHz, 10 MHz, 20 MHz, 40 MHz, 80 MHz, and 160 MHz.

* * * * *